US012578048B2

(12) United States Patent
Ushizaka et al.

(10) Patent No.: US 12,578,048 B2
(45) Date of Patent: Mar. 17, 2026

(54) PIPE JOINT

(71) Applicant: SANOH INDUSTRIAL CO., LTD.,
Tokyo (JP)

(72) Inventors: Toru Ushizaka, Koga (JP); **Akihiko
Horie, Koga (JP); Kazuyuki Tsurumi**,
Koga (JP)

(73) Assignee: SANOH INDUSTRIAL CO., LTD.,
Tokyo (JP)

( * ) Notice: Subject to any disclaimer, the term of this
patent is extended or adjusted under 35
U.S.C. 154(b) by 0 days.

(21) Appl. No.: 18/881,071

(22) PCT Filed: Jul. 10, 2023

(86) PCT No.: PCT/JP2023/025506
§ 371 (c)(1),
(2) Date: Jan. 3, 2025

(87) PCT Pub. No.: WO2024/010098
PCT Pub. Date: Jan. 11, 2024

(65) Prior Publication Data
US 2026/0002620 A1     Jan. 1, 2026

(30) Foreign Application Priority Data
Jul. 8, 2022    (JP) ................................. 2022-110515

(51) Int. Cl.
F16L 37/12          (2006.01)
(52) U.S. Cl.
CPC ....... F16L 37/1225 (2013.01); *F16L 2201/10*
(2013.01)
(58) Field of Classification Search
CPC ..... F16L 37/1225; F16L 37/144; F16L 37/12;
F16L 37/0841; F16L 37/0885; F16L
37/088; F16L 37/142
See application file for complete search history.

(56) References Cited

U.S. PATENT DOCUMENTS 9,915,388 B2 *    3/2018  Hatanaka .............. F16L 37/144
10,502,354 B2 *  12/2019  Terada .................. F16L 37/144
(Continued)

FOREIGN PATENT DOCUMENTS

JP       2004-003588 A      1/2004
JP       2005-172161 A      6/2005
(Continued)

OTHER PUBLICATIONS

International Search Report issued in PCT Patent Application No.
JP/2023/025506 mailed on Aug. 22, 2023.

*Primary Examiner* — Aaron M Dunwoody
(74) *Attorney, Agent, or Firm* — MARSHALL,
GERSTEIN & BORUN LLP

(57)                    ABSTRACT

A pipe joint includes a housing, a retainer capable of moving
from a releasing position to a locking position, a detection
arm provided in the retainer, regulating pressing of the
retainer by a regulating wall of the housing in a state in
which the retainer is at the releasing position, and releasing
the regulation by the regulating wall by bending to an outer
side in a radial direction of the housing, a pipe lock arm
provided on a rear side compared to the detection arm and
facing a spool of the inserted pipe in a state in which the
retainer is at the locking position, and a detection claw
including an inclined surface provided on the detection arm
so as to be inclined with respect to an insertion direction and
converting a pressing force received from the spool into a
force toward the outer side in the radial direction, and a
parallel surface provided on the detection arm so as to be
parallel to the insertion direction of the pipe on an inner side
in a radial direction of the inclined surface, in which a
thickness of a part of the inclined surface is from 20% to
90% of a thickness of the detection claw.

4 Claims, 25 Drawing Sheets

(56)    References Cited

U.S. PATENT DOCUMENTS

| | | | |
|---|---|---|---|
| 11,035,507 B2 * | 6/2021 | Yanagisawa | F16L 37/088 |
| 11,378,212 B2 * | 7/2022 | Kanegae | F16L 37/14 |
| 11,892,109 B2 * | 2/2024 | Kanegae | F16L 37/0885 |
| 2007/0273150 A1 | 11/2007 | Tsurumi | |
| 2011/0127766 A1 | 6/2011 | Tsurumi | |
| 2015/0159793 A1 * | 6/2015 | Nagaya | F16L 37/0885 |
| | | | 285/93 |
| 2016/0040813 A1 * | 2/2016 | Hatanaka | F16L 37/0885 |
| | | | 285/93 |
| 2016/0230913 A1 * | 8/2016 | Hatanaka | F16L 37/0885 |
| 2016/0298800 A1 * | 10/2016 | Gocha | F16L 37/144 |
| 2017/0248263 A1 * | 8/2017 | Terada | F16L 37/144 |
| 2018/0306363 A1 * | 10/2018 | Oberdörfer | F16L 37/144 |
| 2018/0328525 A1 * | 11/2018 | Kerin, Jr. | F02M 37/0017 |
| 2019/0390807 A1 * | 12/2019 | Yanagisawa | F16L 37/088 |
| 2020/0256493 A1 * | 8/2020 | Kanegae | F16L 37/14 |
| 2021/0285581 A1 * | 9/2021 | Rydin | F16L 37/0885 |
| 2022/0074529 A1 * | 3/2022 | Que | F16L 37/0885 |
| 2022/0243850 A1 * | 8/2022 | Teasley | F16L 37/0841 |
| 2022/0333723 A1 * | 10/2022 | Gardner | F16L 37/0885 |
| 2023/0099741 A1 * | 3/2023 | Oi | F16L 37/0841 |
| | | | 285/317 |
| 2023/0400133 A1 * | 12/2023 | Zhou | F16L 37/144 |
| 2024/0068610 A1 * | 2/2024 | Hunt | F16L 37/088 |

FOREIGN PATENT DOCUMENTS

| | | | |
|---|---|---|---|
| JP | 2006-112554 A | 4/2006 | |
| JP | 2007-255669 A | 10/2007 | |
| WO | WO-2014/171330 A1 | 10/2014 | |
| WO | WO-2014/171331 A1 | 10/2014 | |

* cited by examiner

PIPE JOINT

TECHNICAL FIELD

The present disclosure relates to a pipe joint.

BACKGROUND ART

Japanese Patent Application Laid-Open (JP-A) No. 2005-172161 discloses a quick connector in which a retainer is combined with a complete connection indicating member that enables the retainer to be pressed in a case in which a tube inserted into a housing and a spool is beyond a position where the spool can be engaged with the retainer. In the quick connector disclosed in JP-A No. 2005-172161, it is possible to prevent incomplete connection by making a retainer unable to be pressed in to lock, unless the tube is fully inserted to a complete connection position.

JP-A No. 2006-112554 discloses a quick connector in which a retainer is provided with a pair of arms extending so as to sandwich an outer circumference of a housing from both sides, and locking claws with claws facing in an axial direction are formed on distal ends of the arms. An engagement part is formed on the outer circumference of the housing so as to engage with the locking claws such that the retainer can be moved only in a pressing direction in a state in which the retainer is at a releasing position. In the quick connector disclosed in JP-A No. 2006-112554, in addition to reliably preventing the incomplete connection, the retainer can be easily returned to the releasing position without being subject to restrictive conditions including working space in a case in which the connected tube needs to be disconnected.

JP-A No. 2004-003588 discloses a connector in which a regulation surface of a detection claw and a receiving surface of a detection hole are brought into contact with each other, whereby a retainer is hold at a temporary locking position and inadvertent movement to a regular locking position is regulated. In the connector disclosed in JP-A No. 2004-003588, when a pipe is inserted into an insertion hole to a regular depth, a bulge part pushes and opens the detection claw, and thus, the state is shifted from a state in which the regulation surface and the receiving surface are in contact with each other to a state in which both guide surfaces are in contact with each other, and the retainer can be moved from the temporary locking position to the regular locking position. However, in a case in which the pipe is in an incomplete insertion state, the bulge part does not push and open the detection claw, and a pressing operation of the retainer cannot be performed.

SUMMARY OF INVENTION

Technical Problem

There is a structure in which a retainer is temporarily fastened to a housing of a pipe joint at a releasing position, and an arm (detection arm) of the retainer is brought into contact with a wall part of the housing, thereby holding the retainer at the releasing position. In such a structure, the detection arm is provided with an inclined surface, and the inclined surface is pressed by a spool of a pipe inserted into an insertion hole of the housing. As a result, by bending the detection arm to an outer side in a radial direction of the housing to eliminate the contact state with the wall, the retainer can be further pressed into the housing.

In this case, the direction in which the inclined surface is pressed by the spool of the pipe is a direction in which the pipe is inserted into the housing, whereas the direction in which the detection arm is bent is toward the outer side in the radial direction of the housing. Therefore, by securing a large inclination of the inclined surface, the detection arm can be effectively bent by a pressing force from the spool.

However, in a case in which the pipe is inserted into the housing in a state in which the detection arm is bent toward the outer side in the radial direction of the housing, the detection arm rides on the spool of the pipe. In this case, unless the detection arm has a flat part parallel to the insertion direction of the pipe, the detection arm falls off the spool. For example, when the inclined surface is ensured to be large, the flat part will be reduced. That is, it is desirable to have a structure capable of reliably bending the detection arm by the pressing force received from the spool of the pipe and maintaining a state in which the detection arm rides on the spool.

An object of the disclosure is to reliably bend a detection arm by a pressing force received from a spool of a pipe and maintain a state in which the detection arm rides on the spool.

Solution to Problem

A pipe joint of a first aspect includes a housing formed with an insertion hole into which a pipe including an annular spool is inserted, a retainer attached to a storage opening provided at an outer circumferential wall of the housing and movable from a releasing position to a locking position by being pressed in, a detection arm provided at the retainer, regulating pressing of the retainer by a regulating wall of the housing in a state in which the retainer is at the releasing position, and releasing the regulation by the regulating wall by bending toward an outer side in a radial direction of the housing, a pipe lock arm provided on a rear side in an insertion direction of the pipe compared to the detection arm in the retainer and facing, in a state in which the retainer is at the locking position, the spool of the pipe inserted at a predetermined position in the housing, in the insertion hole and on the rear side in the insertion direction, and a detection claw including an inclined surface provided at the detection arm so as to be inclined with respect to the insertion direction of the pipe into the housing and converting a pressing force received from the spool of the pipe inserted into the housing, into a force toward the outer side in the radial direction, and a parallel surface provided at the detection arm so as to be parallel to the insertion direction of the pipe on an inner side in a radial direction of the inclined surface and riding on the spool of the pipe in a state in which the detection arm is bent toward the outer side in the radial direction, in which a thickness of a part provided with the inclined surface in the insertion direction is from 20% to 90% of a thickness of the detection claw in the insertion direction.

In the pipe joint, since the pressing of the retainer at the releasing position is regulated by the regulating wall of the housing, the pressing of the retainer is regulated. Here, when the pipe is inserted into the insertion hole of the housing, the pressing force from the spool of the pipe acts on a contact surface provided in the detection claw of the detection arm during the insertion. Since the contact surface converts the pressing force into a force toward the outer side in the radial direction of the housing, the detection arm is bent toward the outer side in the radial direction, and the regulation of pressing of the retainer by the regulating wall is released. Therefore, the retainer can be pressed in to the locking position on condition that the pipe is sufficiently inserted. Accordingly, it is possible to prevent a defect in which the retainer is pressed in while the pipe is insufficiently inserted and the pipe is not locked. In the state in which the retainer is at the locking position, the pipe lock arm of the retainer faces the spool in the insertion hole and on the rear side in the insertion direction, and thus the pipe does not come off from the housing.

The detection claw is provided with the parallel surface. The parallel surface is provided at the detection arm so as to be parallel to the insertion direction of the pipe into the housing on an inner side in a radial direction of a tapered part. Since the parallel surface rides on the spool of the pipe in a state in which the detection arm is bent toward the outer side in the radial direction, it is possible to maintain the state in which the detection arm expands toward the outer side in the radial direction.

The thickness of the part provided with the inclined surface is from 20% to 90% of the thickness of the detection claw. By the value being 20% or more, it is possible to secure the angle of the inclined surface for converting the pressing force from the spool into the force toward the outer side in the radial direction as compared to the case of a value less than 20%, and to bend the detection arm reliably. In addition, by the value being 90% or less, the length of the parallel surface in the insertion direction can be ensured as compared to the case of more than 90%, and the state in which the detection arm rides on the spool can be maintained.

In a pipe joint of a second aspect, the inclination angle of the inclined surface with respect to the radial direction of the housing is from 25 to 40 degrees in the pipe joint of the first aspect.

By the inclination angle of the inclined surface being 25 degrees or more, it is possible to reliably convert the pressing force from the spool into the force toward the outer side in the radial direction and to bend the detection arm as compared to the case of an angle less than 25 degrees. In addition, by the inclination angle being 40 degrees or less, it is possible to secure the length of the parallel surface in the insertion direction as compared to the case of an angle more than 40 degrees, and to maintain the state in which the detection arm rides on the spool.

In a pipe joint of a third aspect, a second inclined surface protruding from the detection arm to the inner side in the radial direction and inclined toward the outer side in the radial direction on progression toward the rear side is included on a rear side in a pressing direction toward the housing in a protruding part in the pipe joint of the first or second aspect.

In a case in which the retainer is pulled out from the housing, when the second inclined surface comes into contact with the pipe, a part of a force from the pipe is converted into a force for expanding the detection arm toward the outer side in the radial direction. As a result, the retainer is easily pulled out from the housing as compared to a structure without the second inclined surface.

In a pipe joint of a fourth aspect, the pipe joint of any one of the first to third aspects further includes a grip part provided at the retainer so as to be positioned on a rear side in a pressing direction of the retainer from the releasing position toward the locking position and protruding in a direction intersecting the pressing direction.

In a case in which the retainer is moved from the locking position to the releasing position and in a case in which the retainer is pulled out from the housing, the grip part is gripped to perform the operation, and the operation is easily performed.

4

Advantageous Effects of Invention

With a technique of the disclosure, it is possible to reliably bend a detection arm by a pressing force received from a spool of a pipe inserted into an insertion hole of a housing, and to maintain a state in which the detection arm rides on the spool.

BRIEF DESCRIPTION OF DRAWINGS

FIG. 2C is a perspective view from a front side showing the pipe joint of the first embodiment of the disclosure in the state in which the retainer is at the releasing position.

FIG. 2E is a cross-sectional view showing the pipe joint of the first embodiment of the disclosure in the state in which the retainer is at the releasing position, in a longitudinal cross section along the axial direction of the cylindrical part.

FIG. 3A is a perspective view showing the pipe joint of the first embodiment of the disclosure in a state in which a pipe is partially inserted into a housing.

FIG. 3F is a cross-sectional view showing the pipe joint of the first embodiment of the disclosure in a state in which the pipe is further inserted into the housing from the state shown in FIG. 3E.

FIG. 3G is a longitudinal cross-sectional view showing the pipe joint of the first embodiment of the disclosure in the state in which the pipe is further inserted into the housing from the state shown in FIG. 3E.

FIG. 3H is a partially broken perspective view showing the pipe joint of the first embodiment of the disclosure in the state in which the pipe is further inserted into the housing from the state shown in FIG. 3E.

DESCRIPTION OF EMBODIMENTS

Hereinafter, a pipe joint 100 of a first embodiment will be described with reference to the drawings.

Figure 1A:
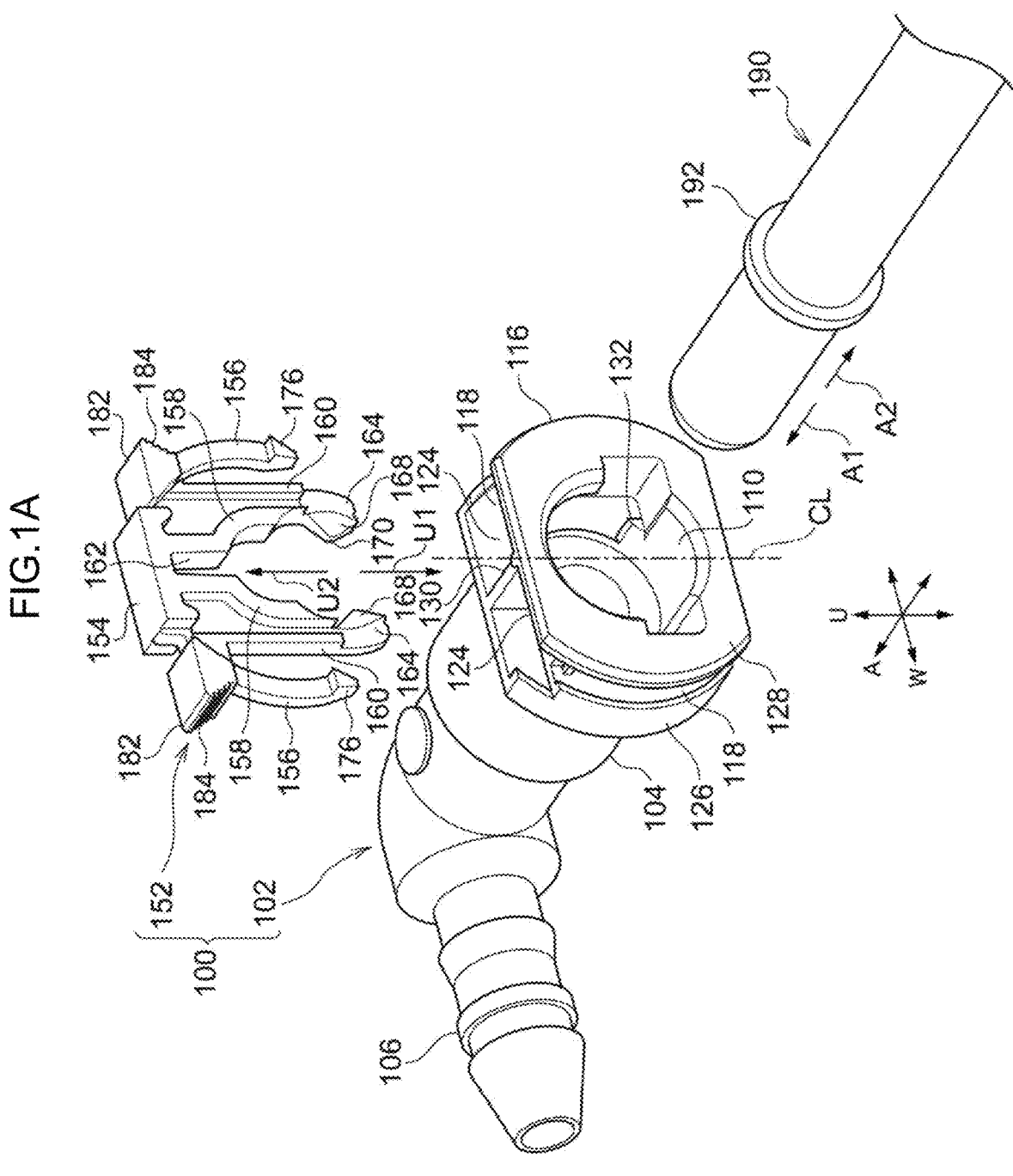
FIG. 1A is an exploded perspective view showing a pipe joint of a first embodiment of the disclosure.

As shown in FIG. 1A, the pipe joint 100 includes a housing 102 and a retainer 152, and is a member that connects a pipe 190 and a tube (not shown). The pipe 190 is an example of a pipe according to a technique of the disclosure. In the pipe 190, an annular spool 192 whose outer diameter is locally increased is formed at a position away from a distal end by a predetermined distance.

On one side of the housing 102, a cylindrical part 104 is provided, and a fitting 106 is provided on the other side. The cylindrical part 104 has a cylindrical shape.

Figure 1B:
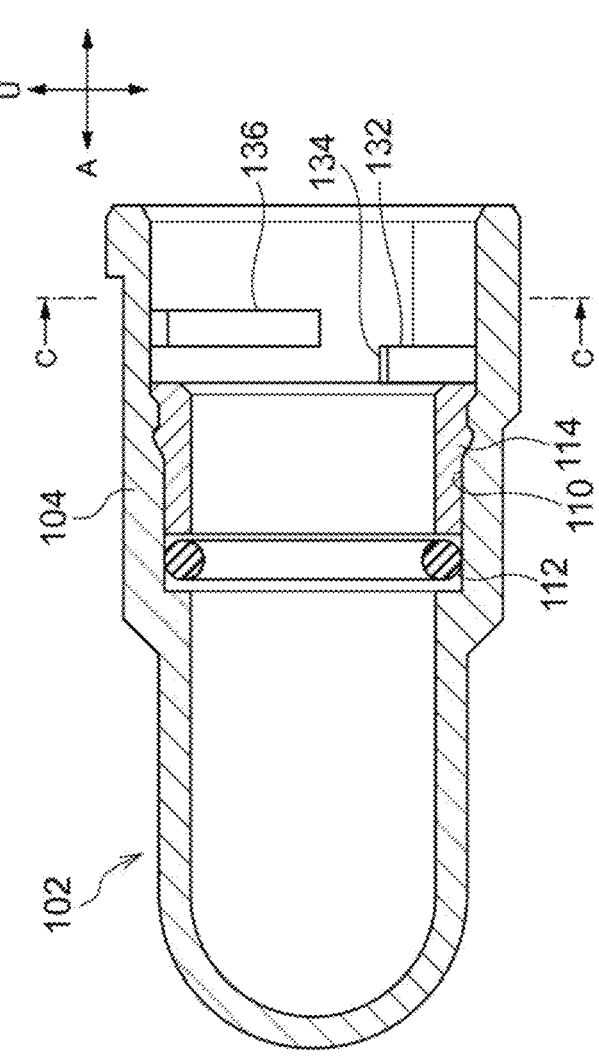
FIG. 1B is a cross-sectional view showing the pipe joint of the first embodiment of the disclosure in a longitudinal cross section taken along an axial direction of a cylindrical part.

As also shown in FIG. 1B, the inside of the cylindrical part 104 is an insertion hole 110 into which the pipe 190 is inserted. That is, the housing 102 is formed with the insertion hole 110 on one side, into which the pipe 190 is inserted. The pipe 190 is retained by the retainer 152 in a state of being connected to the cylindrical part 104 of the housing 102. The retainer 152 is attached to the housing 102 so as to be movable from a releasing position (see FIGS. 2A to 2C) to a locking position (see FIGS. 4A to 4C) by being pressed in to retain the pipe 190, in a state in which the pipe 190 is inserted to a predetermined position.

Hereinafter, in a case in which the terms "axial direction", "height direction", and "width direction" are simply referred to, they mean the axial direction, the height direction, and the width direction (left-right direction) when the cylindrical part 104 is viewed in an insertion direction of the pipe 190 (direction of an arrow A1). The axial direction, the height direction, and the width direction are indicated by arrows A, U, and W in the drawings. In addition, in a case in which the terms "radial direction" and "circumferential direction" are simply referred to, they mean the radial direction and the circumferential direction of the cylindrical part 104 of the housing 102, respectively, unless otherwise specified.

The cylindrical part 104 has a bilateral symmetrical shape with respect to a center line CL in the width direction. The retainer 152 also has a bilateral symmetrical shape with respect to the center line CL in the width direction in a state of being attached to the housing 102.

For convenience of description, the upper side in FIG. 1A will be described as the upper side of the housing 102 in the following. However, the orientation in a case in which the pipe joint 100 is actually used is not limited to the orientation of the housing 102.

In a case in which the terms "front side" and "rear side" are simply referred to, they mean the front side and the rear side, respectively, in the direction in which the pipe 190 is inserted into the cylindrical part 104 in the following. In the drawings, the direction in which the pipe 190 is inserted into the cylindrical part 104 is indicated by the arrow A1, and the direction in which the pipe is pulled out is indicated by the arrow A2.

The other side of the housing 102 is formed so as to be bent substantially at a right angle with respect to the cylindrical part 104 in the present embodiment. However, the direction and angle of bending the other side of the housing 102 are not particularly limited. Furthermore, the other side of the housing 102 may be formed straight with respect to the cylindrical part 104 without being bent in this manner.

The fitting 106 has a cylindrical shape, and a plurality of annular grooves is formed on the outer circumference of the fitting 106. The tube (not shown) is attached to the outer circumference of the fitting 106.

As also shown in FIG. 1B, an O-ring 112 is loaded inside the cylindrical part 104. The O-ring 112 is retained by a top hat 114 so as not to come off to the rear side. The O-ring 112 is elastically in close contact with the outer circumference of the pipe 190 inserted into the insertion hole 110 to seal the inner circumference of the cylindrical part 104 and the outer circumference of the pipe 190.

Figure 1C:
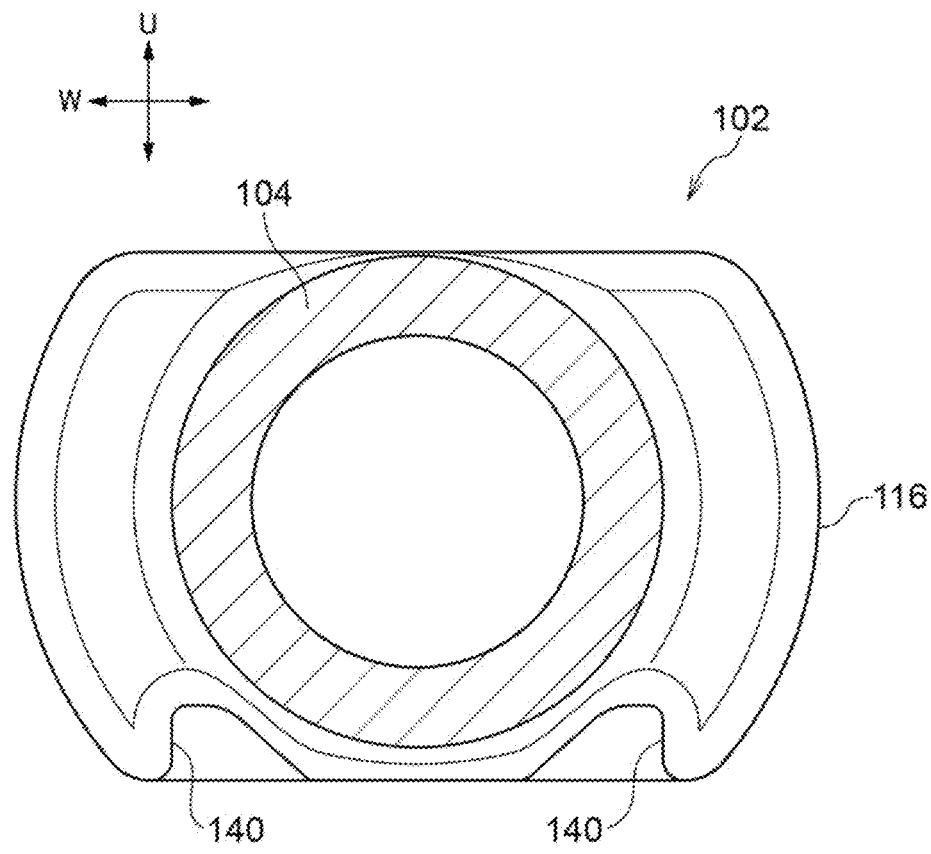
FIG. 1C is a cross-sectional view showing the pipe joint of the first embodiment of the disclosure in a longitudinal cross section in a direction perpendicular to the axial direction of the cylindrical part.

On the rear side of the cylindrical part 104, a large-diameter part 116 is formed, in which the cylindrical part 104 is partially enlarged in diameter. In the present embodiment, as shown in FIGS. 1A and 1C, the large-diameter part 116 has a shape extending in the width direction from the cylindrical part 104. The large-diameter part 116 forms a part of the cylindrical part 104.

In the large-diameter part 116, a groove 118 is formed continuously from an upper end to a lower end on an outer circumference of the large-diameter part 116. The retainer 152 is attached to the housing 102 such that a housing lock arm 156 (details of which will be described later) of the retainer 152 slides from above on the outside of the groove 118. A pressing direction of the retainer 152 from the releasing position to the locking position is indicated by the arrow U1, and a pulling direction is indicated by the arrow U2.

Figure 2A:
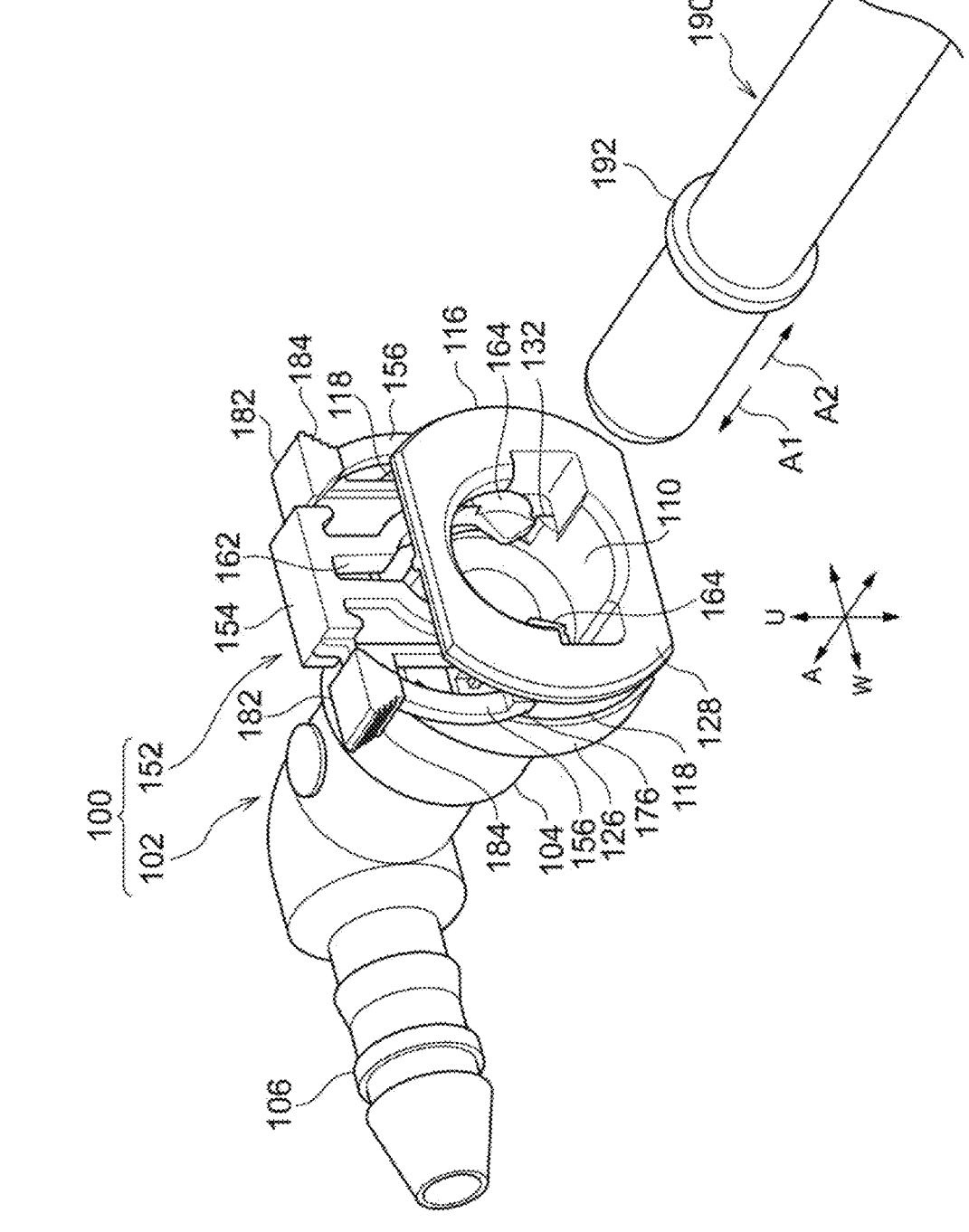
FIG. 2A is a perspective view showing the pipe joint of the first embodiment of the disclosure in a state in which the retainer is at a releasing position.
Figure 2B:
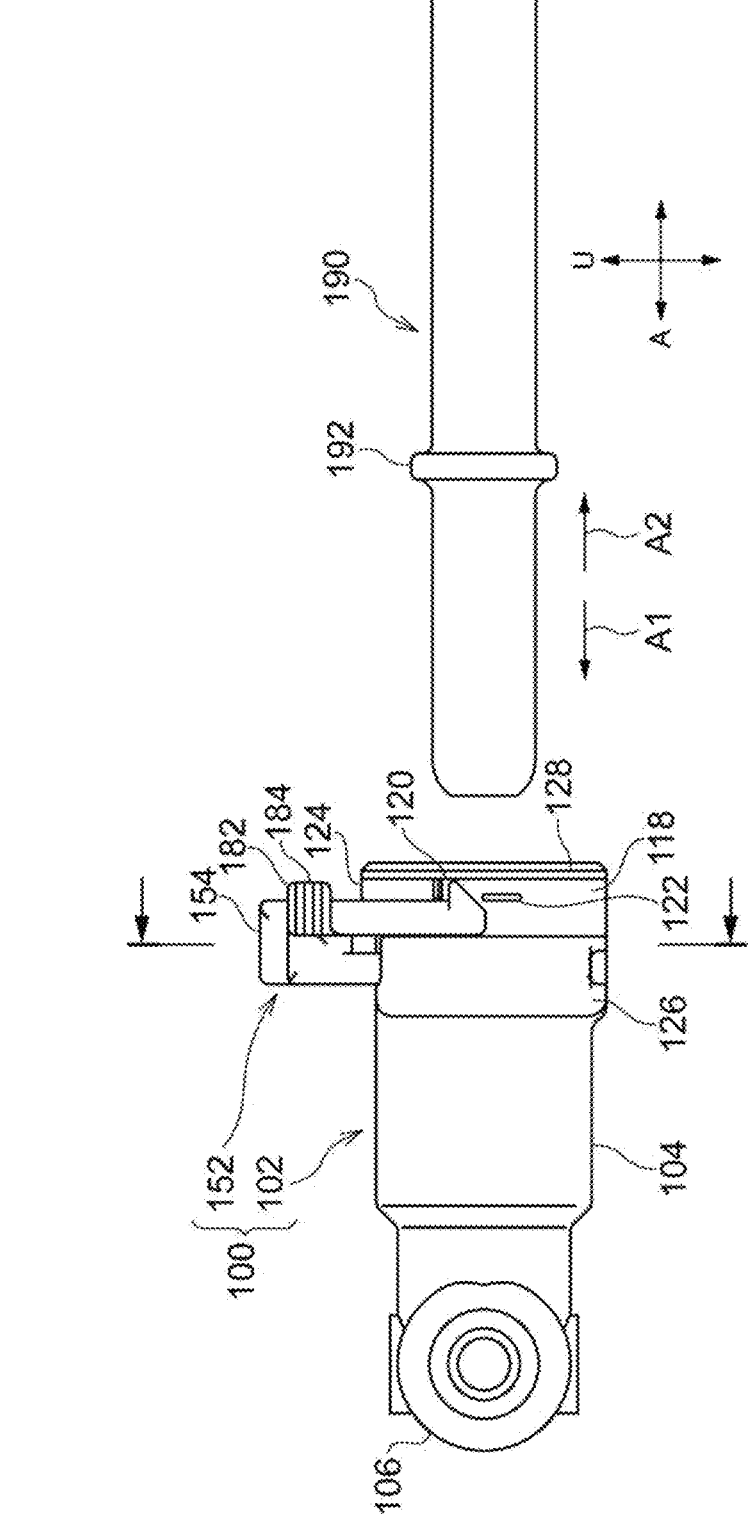
FIG. 2B is a side view showing the pipe joint of the first embodiment of the disclosure in the state in which the retainer is at the releasing position.

As shown in FIG. 2B, projections 120 and 122 for locking a locking claw 176 of the housing lock arm 156 are formed in the groove 118.

Figure 3A:
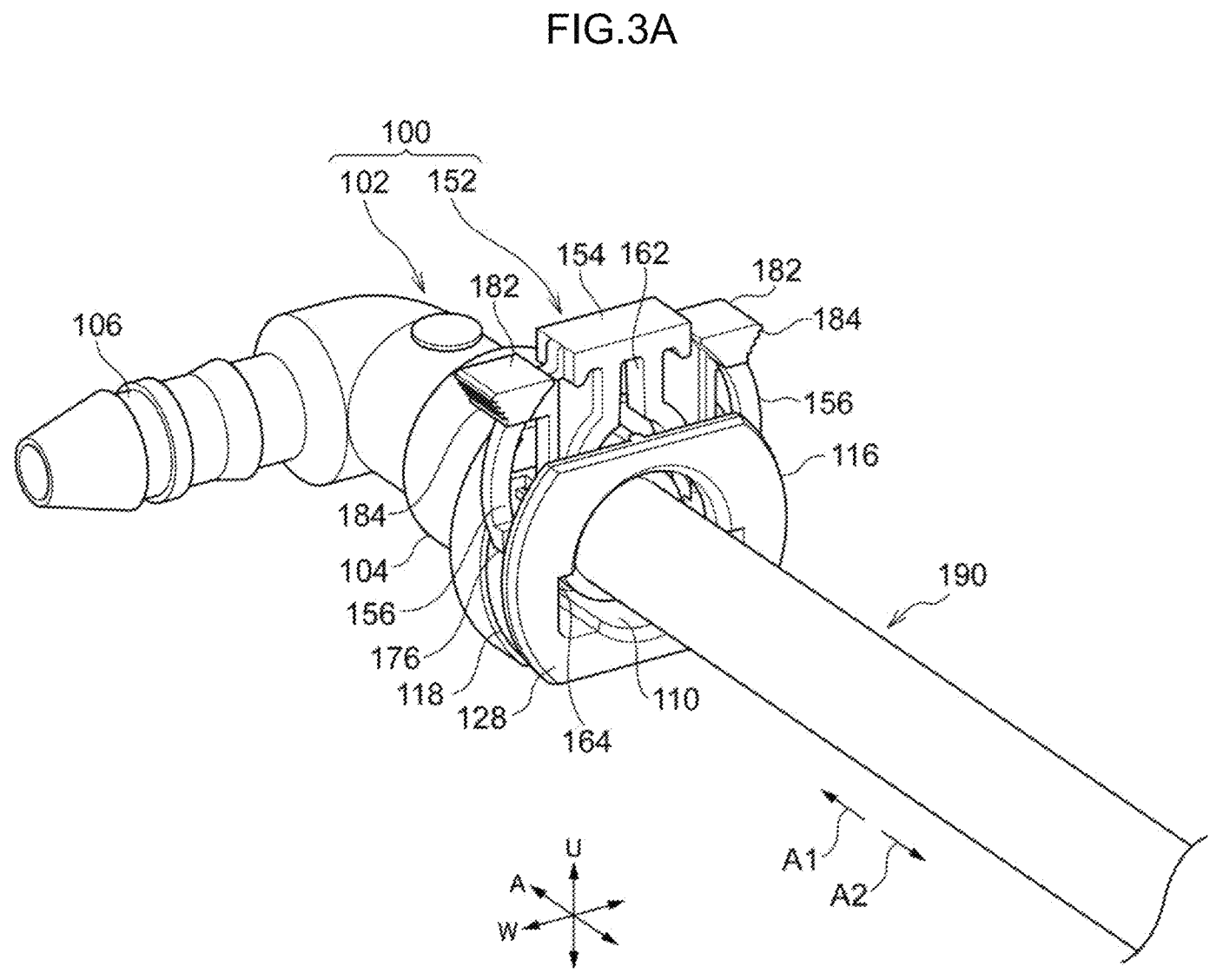

On an outer circumferential wall of the large-diameter part 116, a storage opening 124 is formed. The storage opening 124 passes through the cylindrical part 104 from the outer circumference to the inner circumference in the radial direction at the upper part of the groove 118. As shown in FIGS. 2A and 3A, the retainer 152 is attached to the housing 102 by inserting a detection arm 160 and a pipe lock arm 158

(details of which will be described later) of the retainer 152 into the large-diameter part 116 through the storage opening 124.

In the large-diameter part 116, a front wall 126 and a rear wall 128 are positioned on the front side and the rear side of the storage opening 124, respectively. The front wall 126 and the rear wall 128 are connected by a rib 130 extending in the axial direction. The rib 130 is positioned at the upper part of the large-diameter part 116 and at the center in the width direction. In a state in which the retainer 152 is at the releasing position and the locking position, the front wall 126 faces the detection arm 160 on the front side, and the rear wall 128 faces the pipe lock arm 158 on the rear side.

Figure 2C:
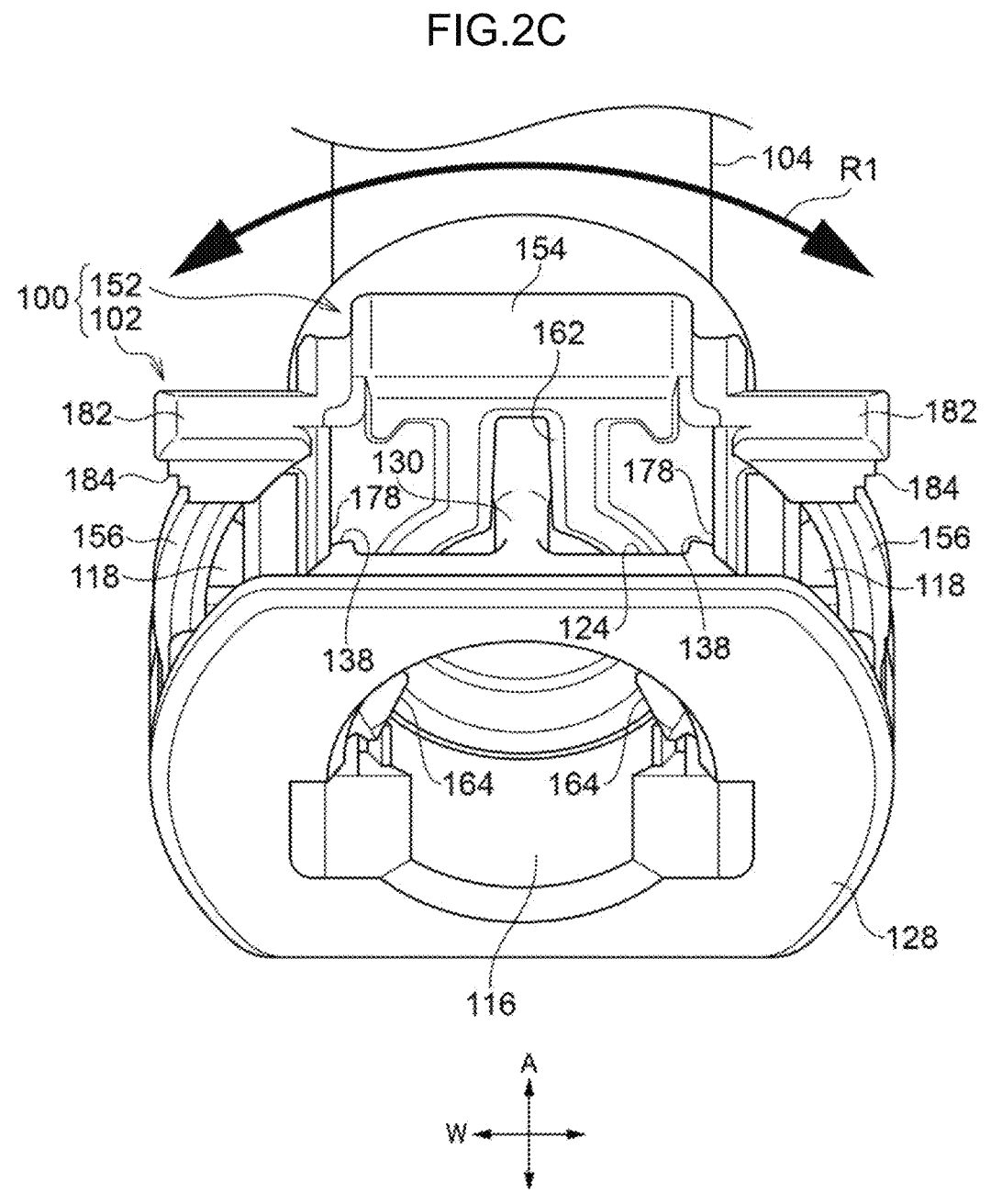
Figure 2D:
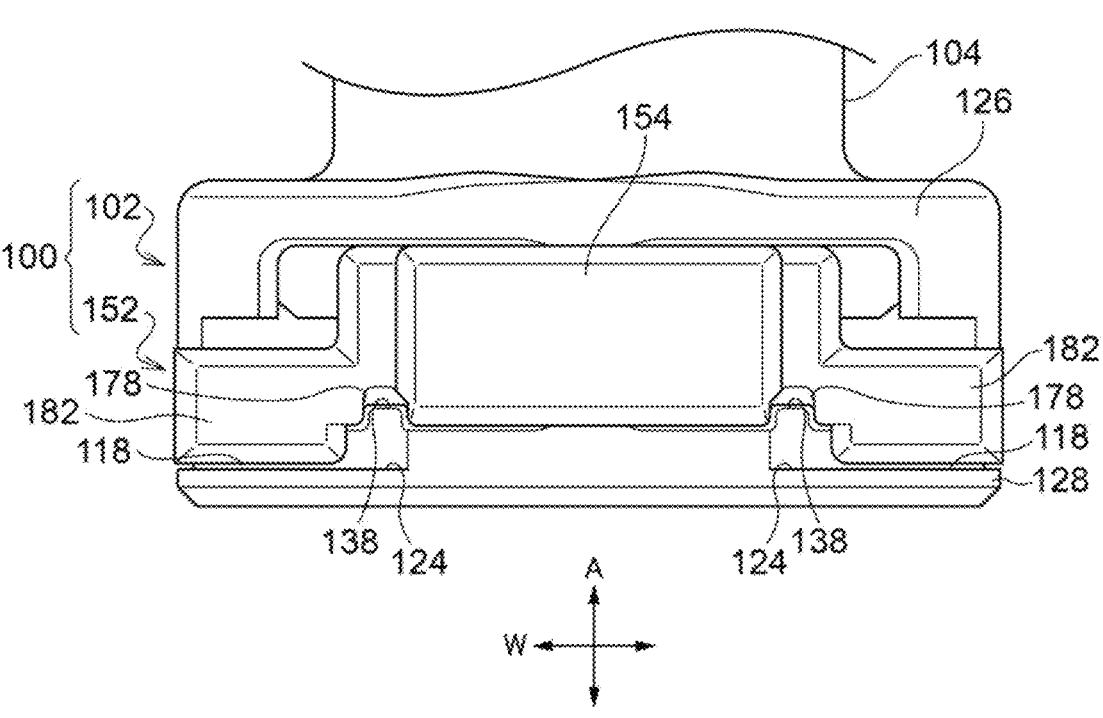
FIG. 2D is a plan view showing the pipe joint of the first embodiment of the disclosure in the state in which the retainer is at the releasing position.
Figure 2E:
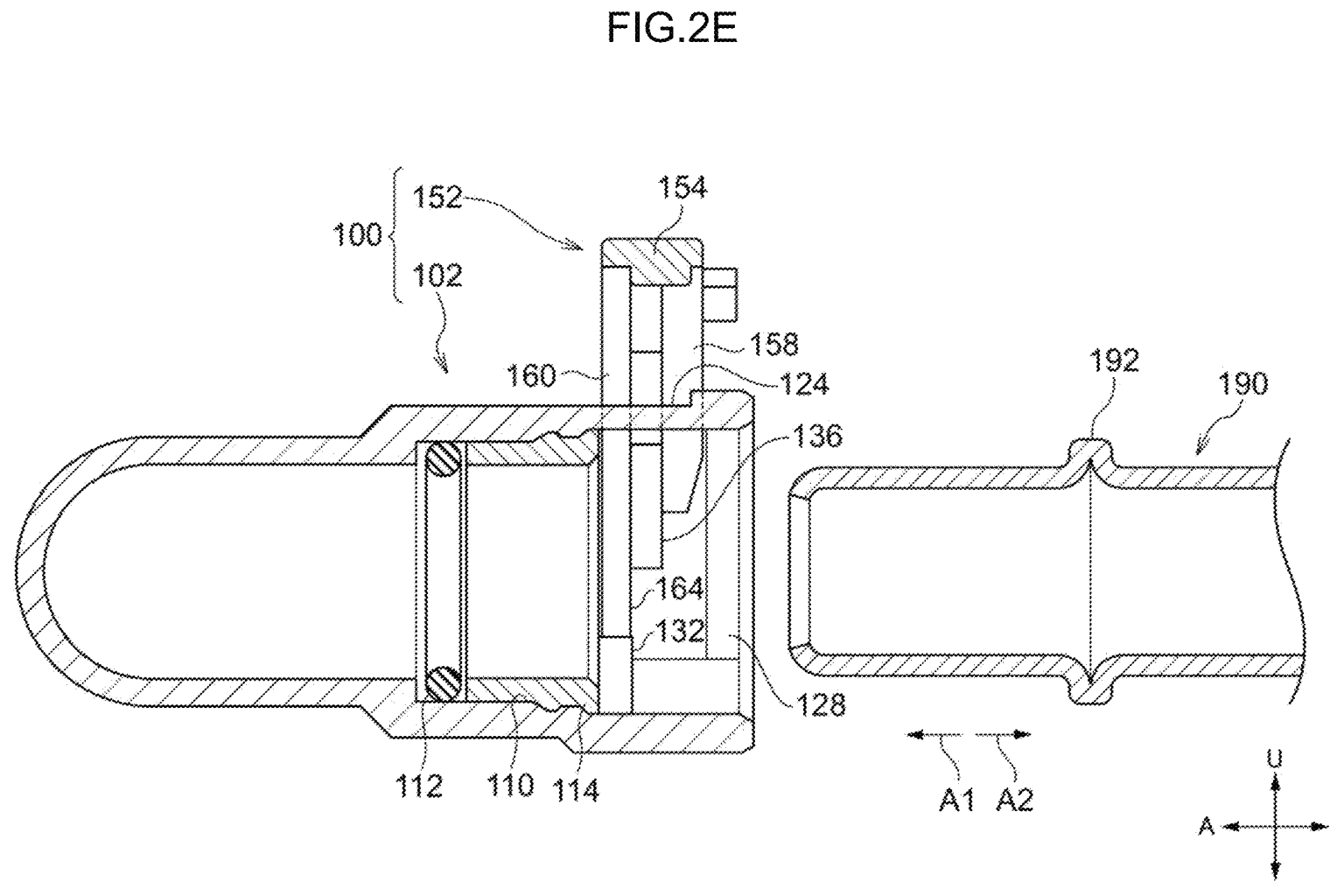
Figure 2F:
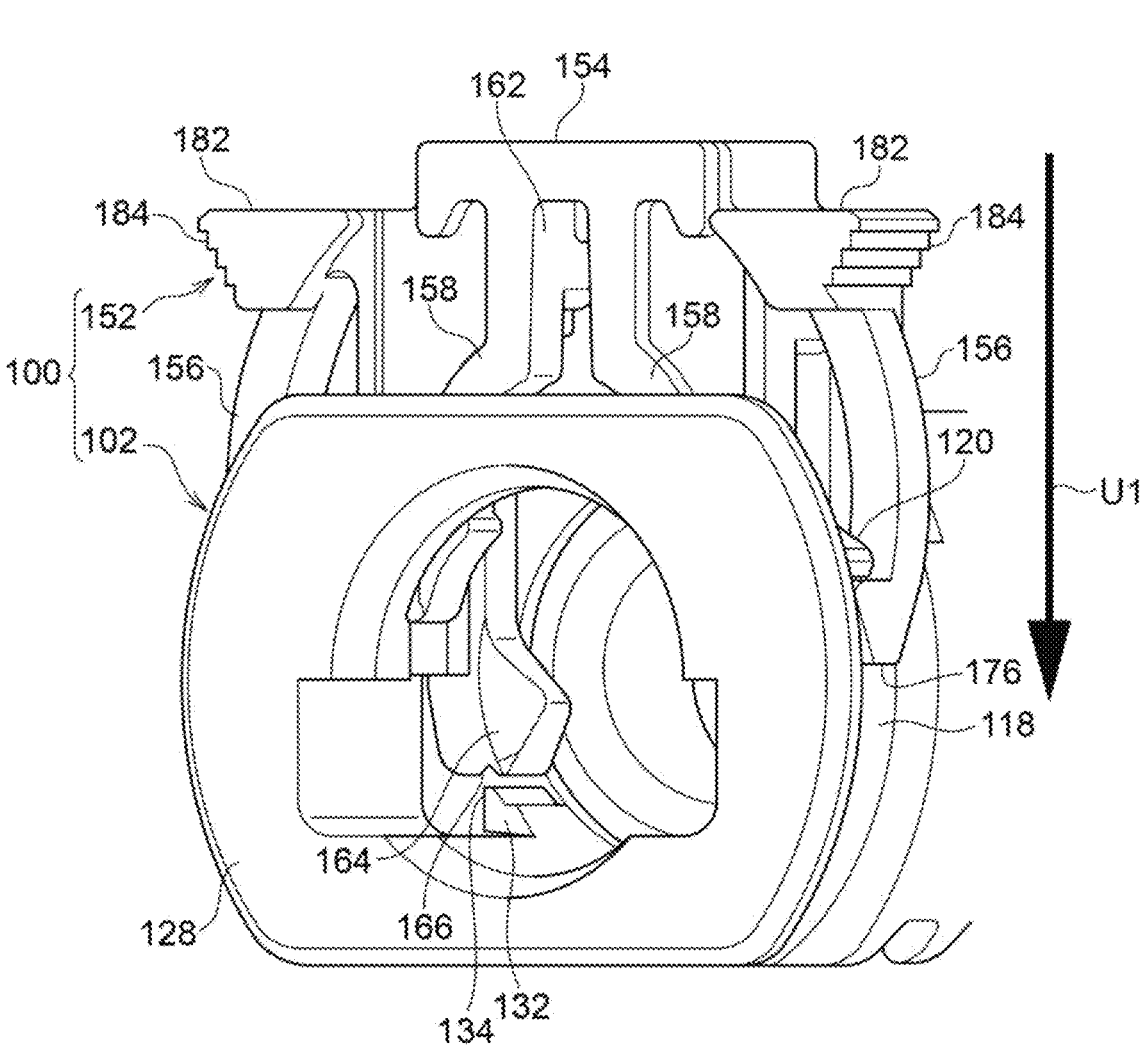
FIG. 2F is a perspective view showing the pipe joint of the first embodiment of the disclosure in the state in which the retainer is at the releasing position.

As also shown in FIGS. 2E and 2F, a regulating wall 132 is formed in the housing 102. The regulating wall 132 is positioned below the detection claw 164 in the state in which the retainer 152 is at the releasing position.

Figure 2G:
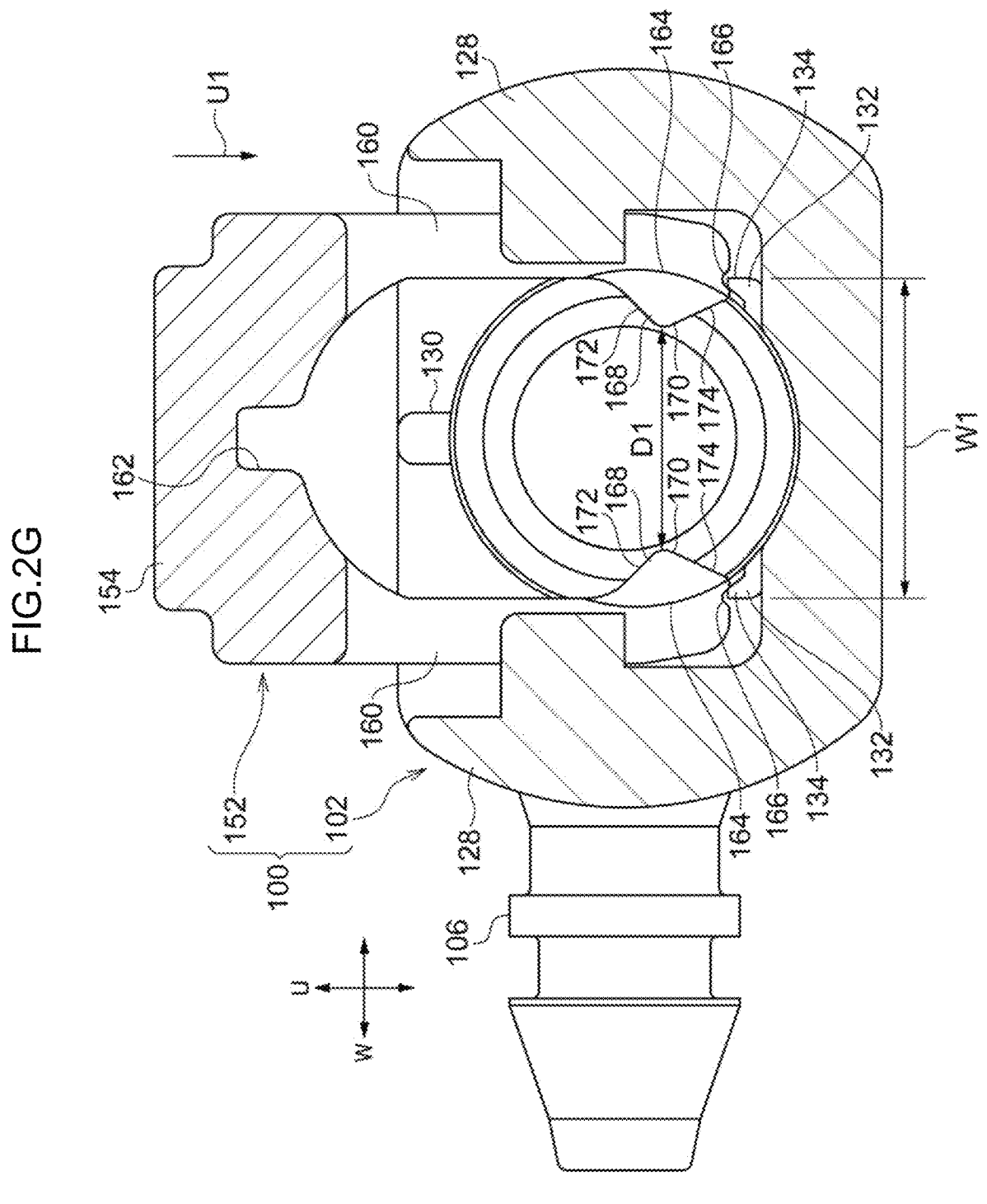
FIG. 2G is a cross-sectional view showing the pipe joint of the first embodiment of the disclosure in the state in which the retainer is at the releasing position, in a longitudinal cross section in a direction perpendicular to the axial direction of the cylindrical part.

As shown in FIG. 2G, the upper part of the regulating wall 132 is curved with a curvature along the outer circumference of the spool 192 and protrudes toward the outer side in the width direction. The state shown in FIG. 2G is a state in which the detection arm 160 is inserted into the large-diameter part 116 from the storage opening 124 and is at the releasing position. Here, in a case in which the detection arm 160 is in a natural state (a non-bending state), an interval D1 of the detection claw 164 is narrower than a width W1 of the regulating wall 132. Therefore, when the retainer 152 is moved in the direction of the arrow U1 with respect to the housing 102, the distal end of the detection arm 160 comes into contact with the regulating wall 132. Accordingly, the pressing of the retainer 152 in the direction of the arrow U1 is temporarily blocked. In this state, the locking claw 176 of the housing lock arm 156 is locked by the projection 120 described above. That is, the retainer 152 is regulated from being pressed in by the regulating wall 132 and is maintained at the releasing position.

On the other hand, in a state in which the detection arm 160 is bent toward the outer side in the width direction, the interval D1 of the detection claw 164 becomes the width W1 of the regulating wall 132 or wider. Therefore, when the detection arm 160 is bent toward the outer side in the width direction, the detection claw 164 is not in contact with the regulating wall 132, and the retainer 152 can be moved further downward. However, the retainer 152 may have a structure capable of being pressed (moved downward) by passing over the catch with the regulating wall 132, even though the detection claw 164 is not completely non-contact with the regulating wall 132 and remains in a contact state.

The regulating wall 132 is formed with a housing protrusion 134 protruding upward. The housing protrusion 134 is positioned at a position corresponding to a detection claw recess 166 formed at the distal end of the detection claw 164 of the retainer 152. As described later, in a state in which the retainer 152 is at the releasing position with respect to the housing 102, the detection claw recess 166 and the housing protrusion 134 are engaged with each other, whereby the detection arm 160 is not inadvertently bent toward the outer side in the width direction, as shown in FIG. 2G. However, the shapes of the detection claw recess 166 and the housing protrusion 134 are set so as to release the engagement between the detection claw recess 166 and the housing protrusion 134 and allow the bending of the detection arm 160 toward the outer side in the width direction in a case in which a part of a pressing force acting on the detection claw 164 from the spool 192 of the pipe 190 acts as a force for bending the detection arm 160 toward the outer side in the width direction.

On the outer side in the width direction of the regulating wall 132, the storage opening 124 is opened to the lower end of the housing 102. When the detection arm 160 is bent toward the outer side in the width direction in the state in which the retainer 152 is at the releasing position, the distal end of the detection arm 160 reaches a position at which the detection arm 160 does not face the regulating wall 132, that is, a release position with respect to the regulating wall 132. In this state, the retainer 152 can be further pressed into the housing 102 and moved in the direction of the arrow U1.

The storage opening 124 is formed with a partition wall 136, which is an example of a facing wall, at a central position on the front side. The partition wall 136 is a wall that partitions the storage opening 124 into a front side part and a rear side part. The detection arm 160 of the retainer 152 is inserted into the front side part of the storage opening 124. The pipe lock arm 158 of the retainer 152 is inserted into the rear side part of the storage opening 124. Therefore, in the state in which the retainer 152 is at the releasing position, the partition wall 136 faces the detection arm 160 on the rear side and faces the pipe lock arm 158 on the front side, as also shown in FIGS. 2A and 3A.

Figure 3B:
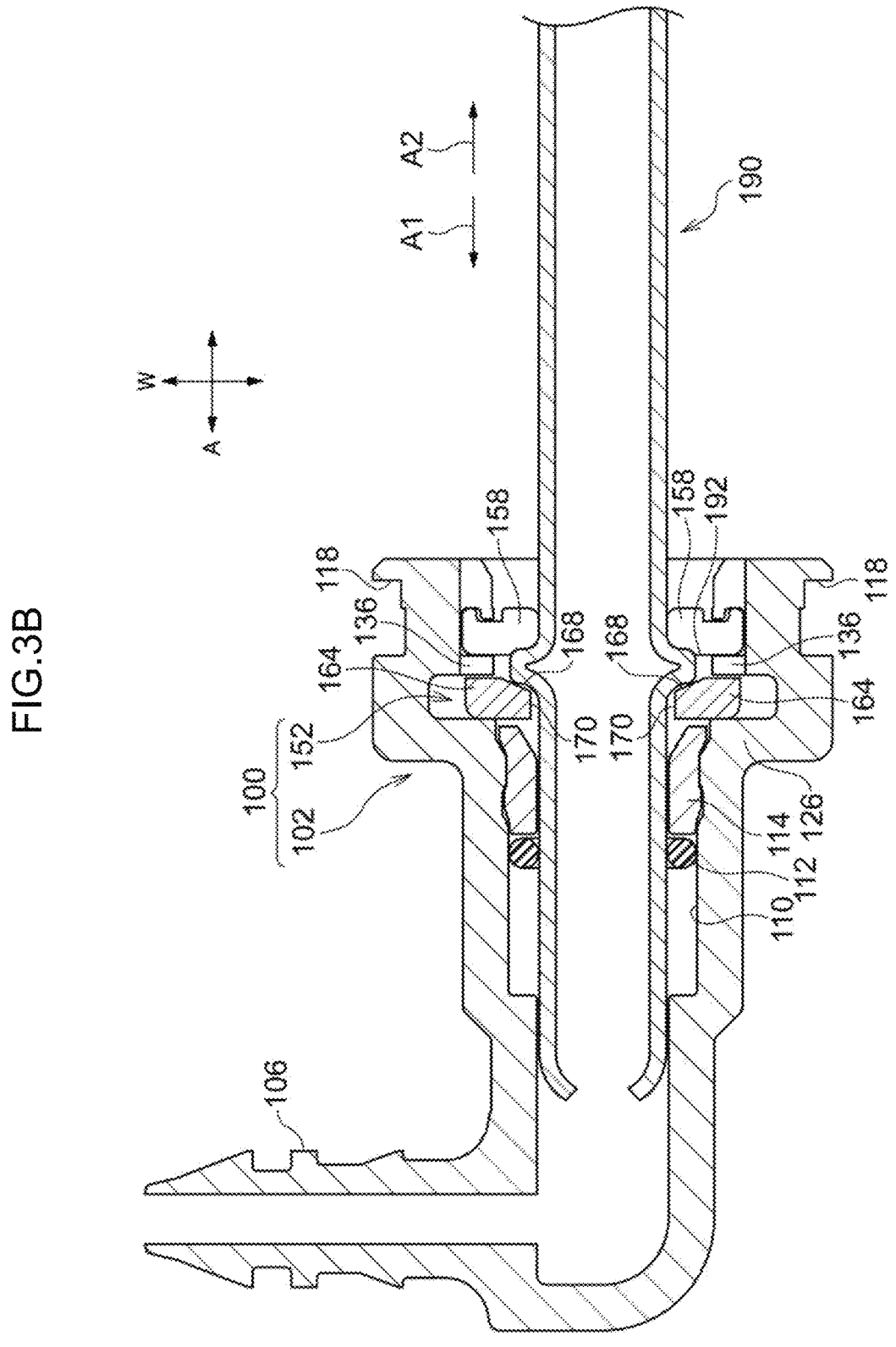
FIG. 3B is a cross-sectional view showing the pipe joint of the first embodiment of the disclosure in the state in which the pipe is partially inserted into the housing.
Figure 3C:
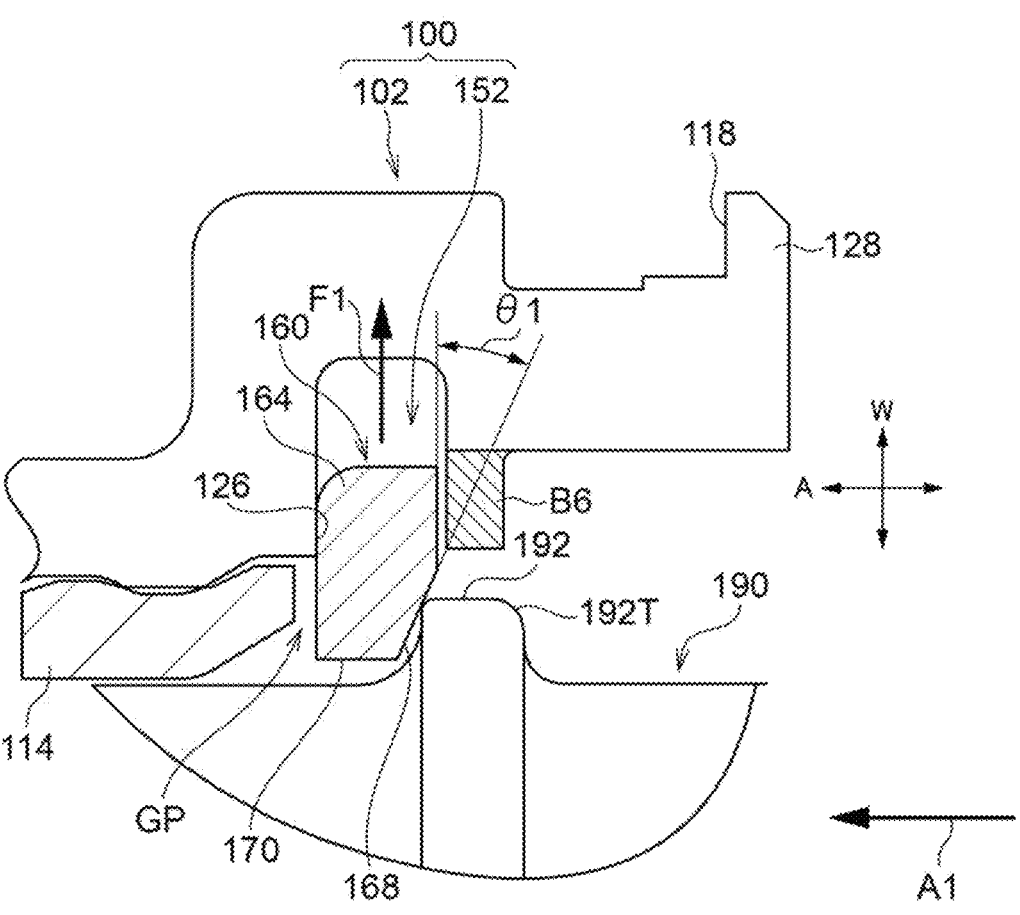
FIG. 3C is a partially enlarged cross-sectional view showing the pipe joint of the first embodiment of the disclosure in the state in which the pipe is partially inserted into the housing.

Furthermore, in the state in which the retainer 152 is at the releasing position, the front wall 126 is at a position on the front side of each detection arm 160 and offset toward the inner side in the width direction, as shown in FIG. 3C. The top hat 114 faces each detection arm 160 on the front side and the inner side in the width direction. However, a gap GP is formed between the detection arm 160 and the top hat 114.

As shown in FIGS. 2C and 2D, the rear wall 128 of the housing 102 is formed with a protrusion 138 on a surface on the front side. The protrusion 138 faces a wall part 178 formed in the retainer 152 in a direction intersecting the pressing direction in the state in which the retainer 152 is at the releasing position. In particular, the protrusion 138 faces the wall part 178 on the outer side in the width direction in the present embodiment. As a result, the retainer 152 at the releasing position is blocked from moving in the width direction with respect to the housing 102. In addition, even in a case in which the retainer 152 is to rotate in the circumferential direction with respect to the housing 102 (rotation in the direction of the arrow R1 shown in FIG. 2C), the protrusion 138 faces the wall part 178 in the vicinity of the wall part 178, and the rotation in the circumferential direction (rotation in the direction of the arrow R1 shown in FIG. 2C) is blocked.

Figure 4A:
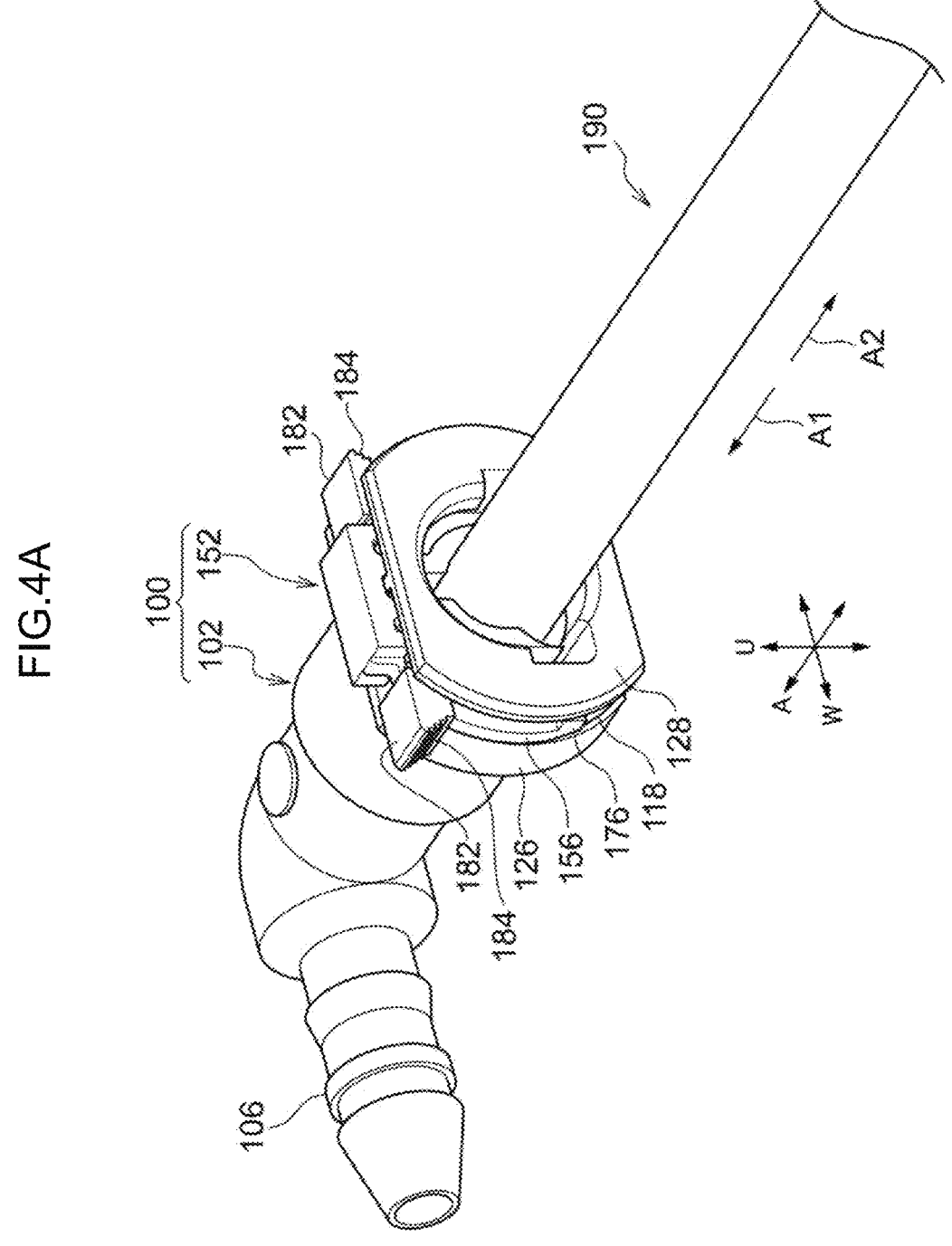
FIG. 4A is a perspective view showing the pipe joint of the first embodiment of the disclosure in a state in which the pipe is locked to the housing.
Figure 4B:
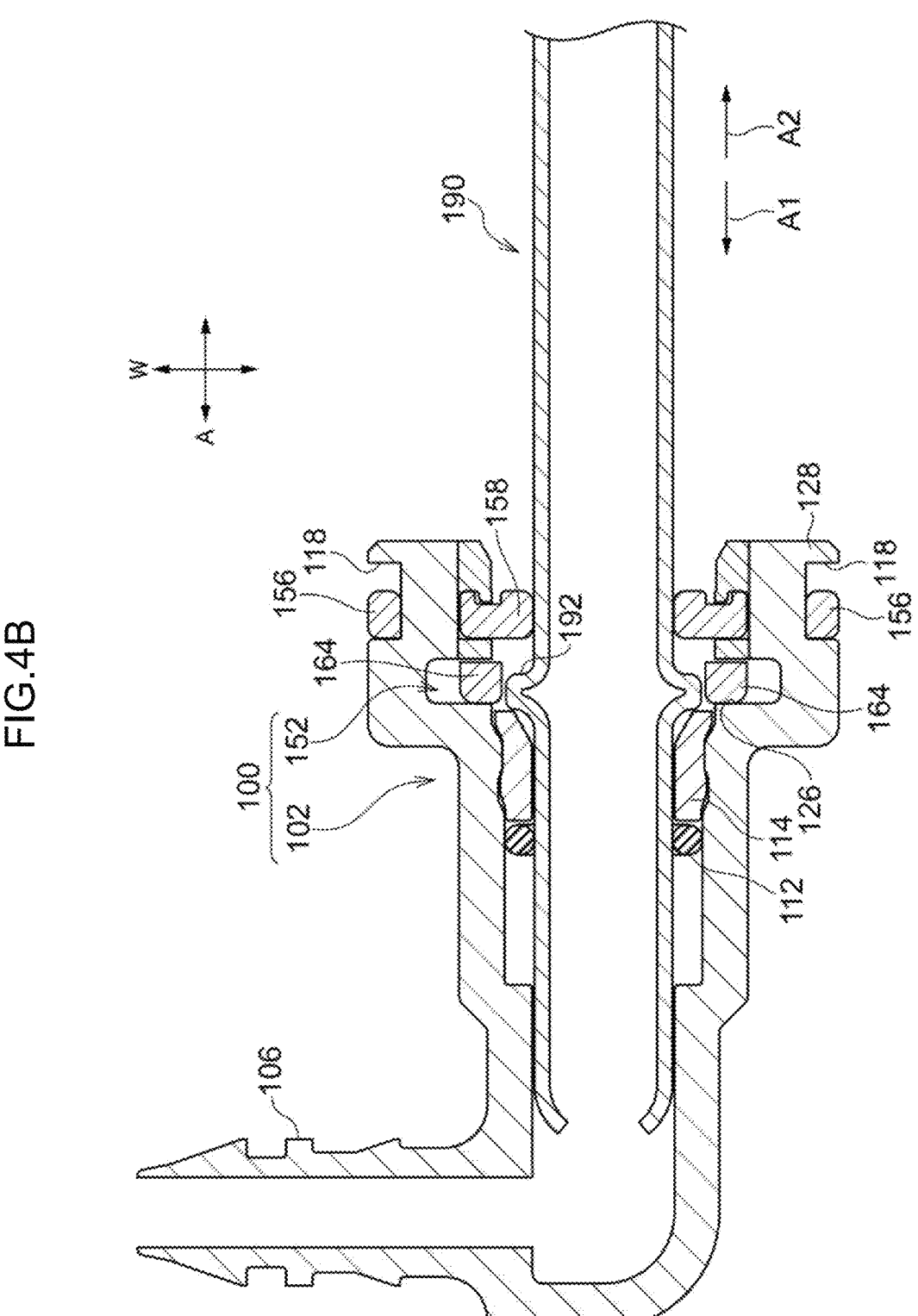
FIG. 4B is a cross-sectional view showing the pipe joint of the first embodiment of the disclosure in the state in which the pipe is locked to the housing.
Figure 4C:
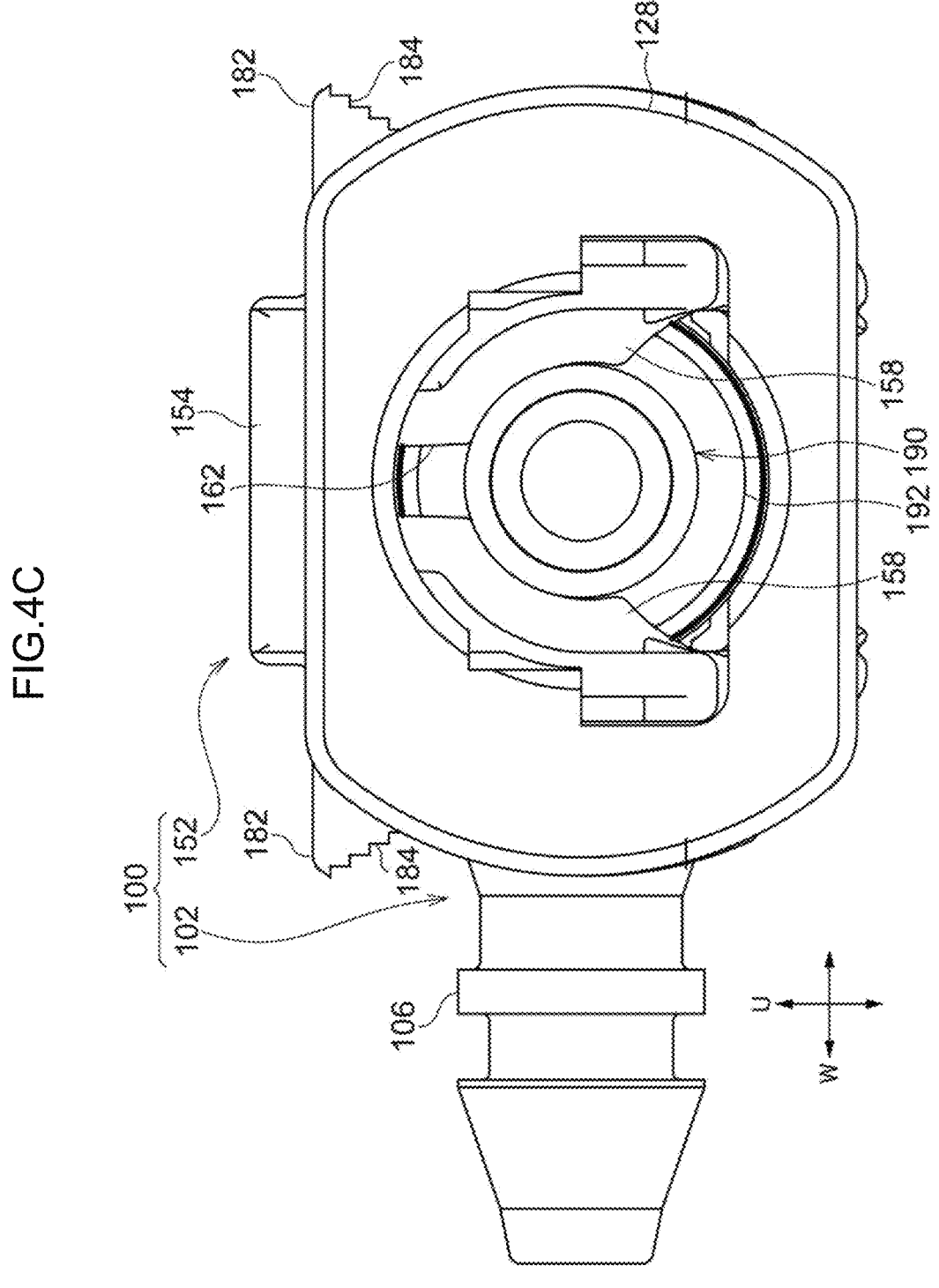
FIG. 4C is a front view showing the pipe joint of the first embodiment of the disclosure in the state in which the pipe is locked to the housing.
Figure 4D:
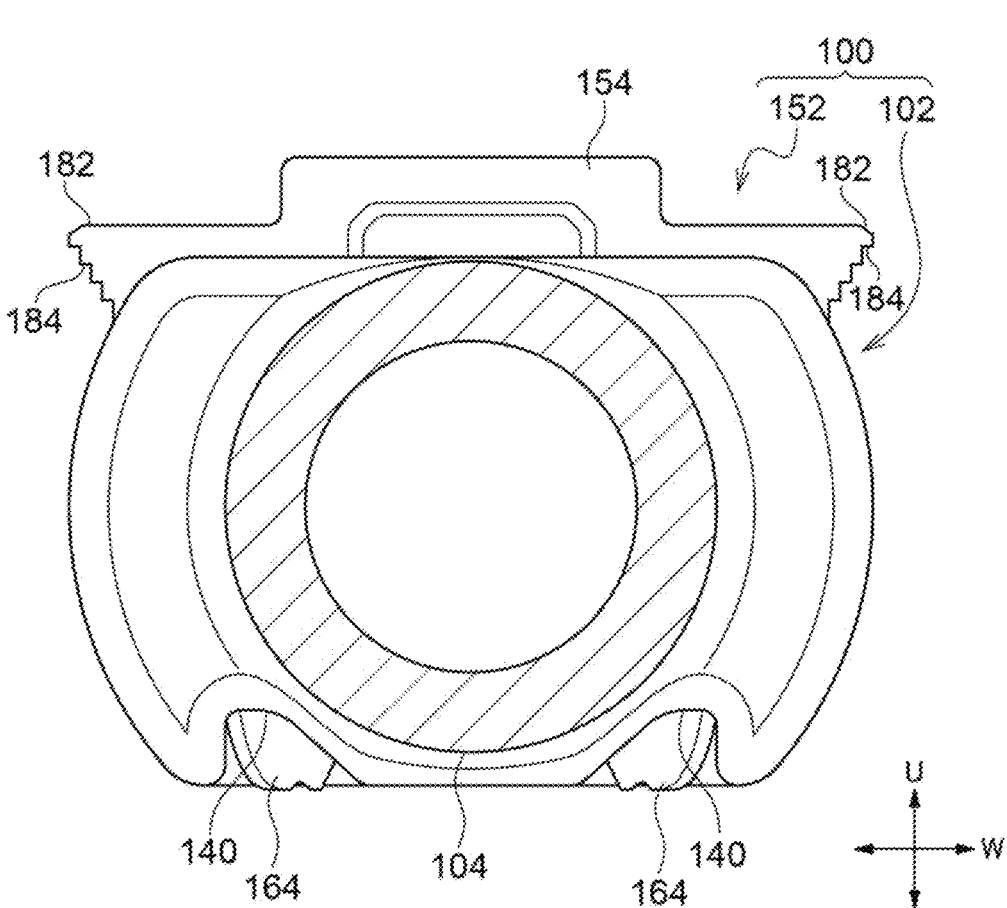
FIG. 4D is a longitudinal cross-sectional view showing the pipe joint of the first embodiment of the disclosure in the state in which the pipe is locked to the housing.

As shown in FIGS. 1C and 4D, at the lower part of the front wall 126, a notch 140 is provided. The notch 140 is formed in a shape in which the front wall 126 is partially cut out from the outer circumference. In addition, the notch 140 passes through the front wall 126 from the front side to the rear side, and light passes from the front side to the rear side. Accordingly, the detection claw 164 can be visually recognized from the front side through the notch 140 in the state in which retainer 152 is at the locking position.

Figure 1D:
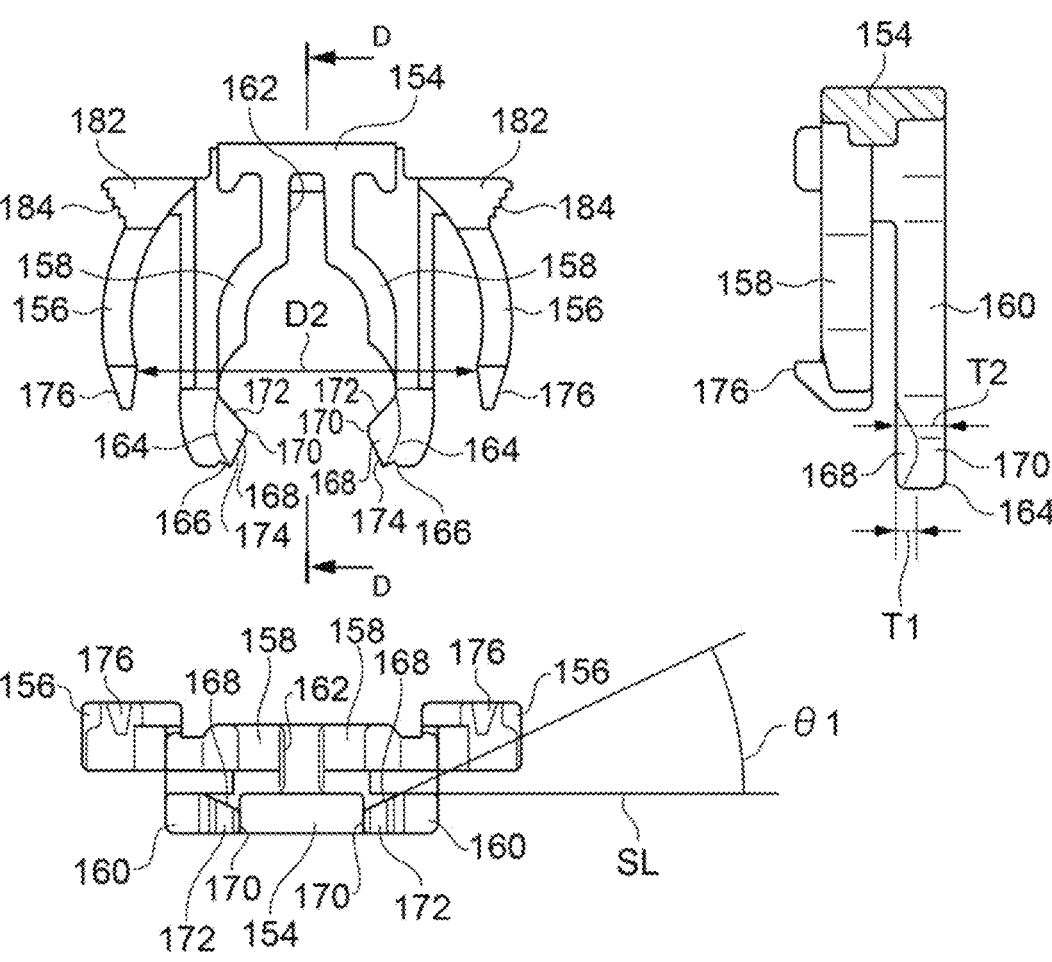
FIG. 1D is a front view, a bottom view, and a cross-sectional view taken along line D-D of the front view, showing a retainer of the pipe joint of the first embodiment of the disclosure.
Figure 1E:
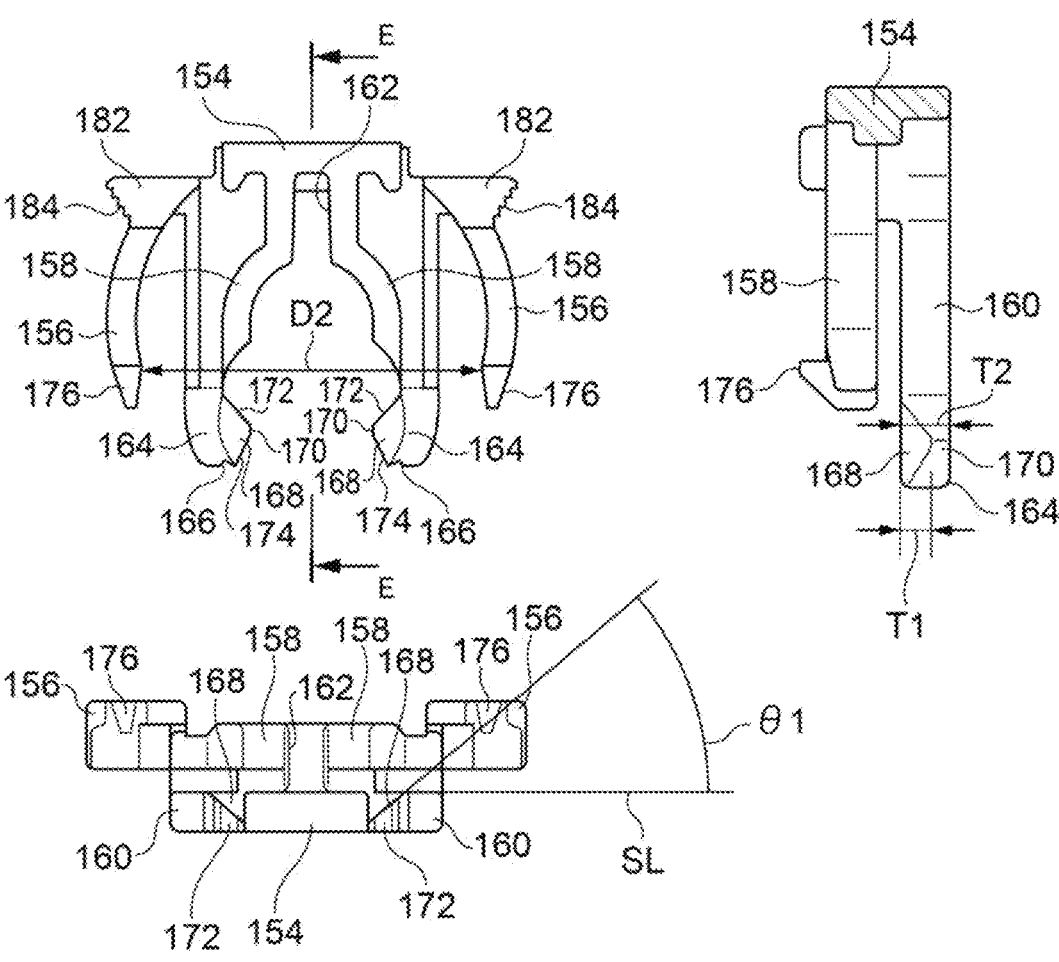
FIG. 1E is a front view, a bottom view, and a cross-sectional view taken along line E-E of the front view, showing an example of the retainer of the pipe joint of the first embodiment of the disclosure, which is different from FIG. 1D.

As shown in FIGS. 1A, 1D, and 1E, the retainer 152 includes a base part 154, the housing lock arm 156, the pipe lock arm 158, and the detection arm 160. Since the retainer 152 is formed to be bilaterally symmetrical as a whole, these arms are also formed in pairs so as to be bilaterally symmetrical in the width direction. In addition, these arms extend downward from the base part 154.

The base part 154 is a part positioned on the rear side in the pressing direction of the retainer 152 with respect to the housing 102, that is, on the upper side. On the lower surface of the base part 154, a recess 162 is formed at the center in the width direction. The recess 162 is formed at a position corresponding to the rib 130 of the housing 102 in a case in which the retainer 152 is pressed into the housing 102 in the direction of the arrow U1 to be attached to the housing 102. The position and shape of the recess 162 are set in relation to the rib 130 such that the rib 130 fits into the recess 162 when the retainer 152 is oriented correctly with respect to the housing 102 (as shown in FIG. 2E, the detection arm 160 faces the front side, and the pipe lock arm 158 faces the rear side) but does not fit in the reversed orientation (orientation in which the front side and the rear side are reversed).

In the present embodiment, the detection arm 160 is formed on the front side compared to the housing lock arm 156 and the pipe lock arm 158. At the distal end of the detection arm 160, a detection claw 164 is formed. The detection claw 164 includes an inclined surface 168 and a parallel surface 170. The inclined surface 168 is formed on the detection claw 164 at a position that comes into contact with the spool 192 of the pipe 190 when the pipe 190 is inserted into the insertion hole 110.

As shown in FIGS. 1D and 1E, the inclined surface 168 is inclined to the front side at a predetermined inclination angle $\theta 1$ toward the inner side in the width direction. The inclination angle $\theta 1$ is an angle with respect to a reference line SL extending in the width direction. When the pipe 190 is further pressed in the insertion direction in a state in which the spool 192 is in contact with the inclined surface 168, the inclined surface 168 converts a part of the pressing force in the insertion direction received from the spool 192 into a force for bending each detection arm 160 toward the outer side in the width direction. Each detection arm 160 is bent toward the outer side in the width direction, whereby the pipe 190 can be further inserted into the cylindrical part 104.

The inclination angle $\theta 1$ of the inclined surface 168 is not particularly limited as long as such an effect is achieved, but the inclination angle $\theta 1$ is, for example, from 25 to 40 degrees. The inclination angle $\theta 1$ is about 25 degrees in the example shown in FIG. 1D, and the inclination angle $\theta 1$ is about 40 degrees in the example shown in FIG. 1E.

The parallel surface 170 is formed continuously from the inclined surface 168 at a position on the inner side of the detection claw 164 in the width direction. Two parallel surfaces 170 are each parallel to the insertion direction, and the parallel surfaces 170 are also parallel to each other. The parallel surface 170 is a surface that rides on the outer circumferential end of the spool 192 as the pipe 190 is inserted into the cylindrical part 104 while the detection arm 160 is expanding toward the outer side in the radial direction, as shown in FIG. 3F. Therefore, as the length of the parallel surface 170 in the insertion direction is longer, it is easier to stably maintain a state in which the spool 192 rides on the outer circumferential end (a state in which the spool 192 does not fall off).

Here, the thickness of the part of the detection claw 164 where the inclined surface 168 is provided is represented as T1, and the thickness of the entire detection claw 164 including both the inclined surface 168 and the parallel surface 170 is represented as T2. In the present embodiment, the ratio of the thickness T1 to the thickness T2 (hereinafter, referred to as an "inclined surface ratio") is from 20% to 90%. In a case in which the thickness T2 is constant, the inclination angle $\theta 1$ of the inclined surface 168 increases as the inclined surface ratio increases, but the thickness of the parallel surface 170 decreases. On the other hand, the inclination angle $\theta 1$ of the inclined surface 168 decreases as the value of the inclined surface ratio decreases, but the thickness of the parallel surface 170 increases.

Each detection claw 164 has a shape protruding to the inner side in the width direction in a substantially triangular shape when viewed in the axial direction. On the upper part of the detection claw 164, a second inclined surface 172 inclined downward toward the inner side in the width direction is formed. Furthermore, on the lower part of the detection claw 164, a third inclined surface 174 inclined upward toward the inner side in the width direction.

The third inclined surface 174 is a surface that comes into contact with the outer circumferential end of the spool 192 in a case in which the retainer 152 is pressed in the direction of the arrow U1. As described above, since the third inclined surface 174 is inclined upward toward the inner side in the width direction, in a case in which the retainer 152 is pressed in the direction of the arrow U1, the retainer 152 comes into oblique contact with the outer circumferential end of the spool 192 and slides, thereby facilitating the pressing of the retainer 152.

The second inclined surface 172 is a surface that comes into contact with the lower surface of the regulating wall 132 in a case in which an unlocking operation of moving the retainer 152 at the locking position to the releasing position is performed. As described above, since the second inclined surface 172 is inclined downward toward the inner side in the width direction, in a case in which the retainer 152 moves in the direction of the arrow U2, the retainer 152 comes into contact with the lower surface of the regulating wall 132 and slides, thereby facilitating the unlocking operation of the retainer 152.

At the distal end of the housing lock arm 156, a locking claw 176 protruding rearward is formed. An interval D2 between the left and right locking claws 176 is set so as to be slightly narrower than an interval between the projections 120 formed in the groove 118 in the width direction and an interval between the projections 122 in the width direction. In a case in which the retainer 152 is attached to the housing 102, the housing lock arm 156 is inserted into the groove 118 to bring the locking claw 176 into contact with the projection 120, and the retainer 152 is pressed in the direction of the arrow U1 with respect to the housing 102 from this state. Then, the housing lock arm 156 is bent toward the outer side in the width direction, and the locking claw 176 passes over the projection 120. As a result, the retainer 152 is attached at the "releasing position". At the releasing position, even though the retainer 152 is to be pulled out in the direction of the arrow U2, the locking claw 176 is caught by the projection 120 and resists the pulling.

When the retainer 152 is pressed in the direction of the arrow U1 from the releasing position, the housing lock arm 156 is bent toward the outer side in the width direction, the locking claw 176 passes over the projection 122, and the retainer 152 is positioned at the "locking position". At the locking position, even though the retainer 152 is to be moved in the direction of the arrow U2, the locking claw 176 is caught by the projection 122, and a resisting force acts on the unlocking operation.

The lower part of the pipe lock arm 158, that is, a part far from the base part 154 has a shape curved along the outer circumferential surface of the pipe 190. In a state in which the pipe 190 is inserted into the housing 102 to a predetermined position in the insertion hole 110 and the retainer 152 is pressed into the locking position with respect to the housing 102, the curved part of the pipe lock arm 158 faces the spool 192 on the rear side compared to the spool 192. As a result, when the pipe 190 moves in the direction of the arrow A2, the spool 192 comes into contact with the pipe lock arm 158, and the pipe 190 is blocked from moving in the direction of the arrow A2.

The retainer 152 includes a grip part 182 protruding from the base part 154 toward the outer side in the width direction. Since the grip part 182 protrudes in a direction intersecting the pressing direction (direction of the arrow U1) of the retainer 152 with respect to the housing 102, an operator can easily grip the grip part 182. In particular, the grip part 182 protrudes in a direction perpendicular to the pressing direction in the present embodiment. Therefore, the grip part 182 can be gripped from the outer side in the width direction to press the retainer 152 in the direction of the arrow U1 or to perform the unlocking operation in the direction of the arrow U2, for example. In addition, in a case in which the retainer 152 is pulled out from the housing 102 and disassembled, the operation of pulling out the retainer 152 is facilitated by gripping the grip part 182.

On the lower side of the grip part 182, a stepped surface 184 inclined upward in a stepwise shape toward the outer side in the width direction is formed. In a case in which the operator grips the grip part 182 with fingers from the lower side, the stepped surface 184 applies appropriate sliding resistance to the fingertips of the operator.

Next, effects of the pipe joint 100 of the present embodiment and a method of connecting a pipe using the pipe joint 100 will be described.

In a case in which the pipe 190 is connected to the cylindrical part 104 of the housing 102, first, the retainer 152 is placed in a state of being at the releasing position, as shown in FIGS. 2A and 2B.

In the state in which the retainer 152 is at the releasing position, the housing lock arm 156 of the retainer 152 is placed in the groove 118 of the housing 102. As shown in FIG. 2E, the detection arm 160 and the pipe lock arm 158 are inserted into the storage opening 124. Specifically, in the storage opening 124, the detection arm 160 is inserted into a region on the front side of the partition wall 136, and the pipe lock arm 158 is inserted into a region on the rear side.

In the state in which the retainer 152 is at the releasing position in this manner, a part (inner circumferential part, see FIG. 3C) of the front wall 126 of the housing 102 faces the detection arm 160 on the front side. The rear wall 128 of the housing 102 faces the pipe lock arm 158 on the rear side. As a result, rattling and inclination of the retainer 152 with respect to the housing 102, particularly rattling and inclination in the pressing direction (direction of the arrow U1) and the pulling direction (direction of the arrow U2) are prevented, and the retainer 152 can be maintained at the releasing position in a stable posture with respect to the housing 102.

In the state in which the retainer 152 is at the releasing position, the partition wall 136 further faces the detection arm 160 on the rear side. That is, the front wall 126 faces the front side of the detection arm 160, and the partition wall 136 faces the rear side. This also prevents deformation and inclination of the detection arm 160 with respect to the housing 102, and the retainer 152 can be maintained at the releasing position in a stable posture with respect to the housing 102.

In addition, in the state in which the retainer 152 is at the releasing position, the partition wall 136 faces the pipe lock arm 158 on the front side. That is, the partition wall 136 faces the front side of the pipe lock arm 158, and the rear wall 128 faces the rear side. As a result, deformation and inclination of the pipe lock arm 158 with respect to the housing 102 are prevented, and the retainer 152 can be maintained at the releasing position in a stable posture with respect to the housing 102.

As shown in FIGS. 2C and 2D, in the state in which the retainer 152 is at the releasing position, the protrusion 138 of the rear wall 128 of the housing 102 faces the wall part 178 formed in the retainer 152 in a direction intersecting the pressing direction, particularly on the outer side in the width direction in the present embodiment. As a result, the retainer 152 at the releasing position is prevented from moving in the width direction with respect to the housing 102, and the posture of the retainer 152 with respect to the housing 102 can be maintained.

In this state, as shown in FIGS. 3A and 3B, the pipe 190 is inserted into the insertion hole 110 of the cylindrical part 104 in the direction of the arrow A1. During the insertion, the spool 192 comes into contact with the inclined surface 168 of the detection claw 164. When a force is further applied to the pipe 190 in the insertion direction (the direction of the arrow A1), a part of the pressing force applied from the spool 192 to the inclined surface 168 of the detection claw 164 is converted into a force for moving the distal end side of the detection arm 160 toward the outer side in the width direction (see the arrow F1 shown in FIGS. 3C and 3D), and the distal end side of the detection arm 160 is bent toward the outer side in the width direction. As a result, the pipe 190 can be pressed in the direction of the arrow A1.

Figure 3D:
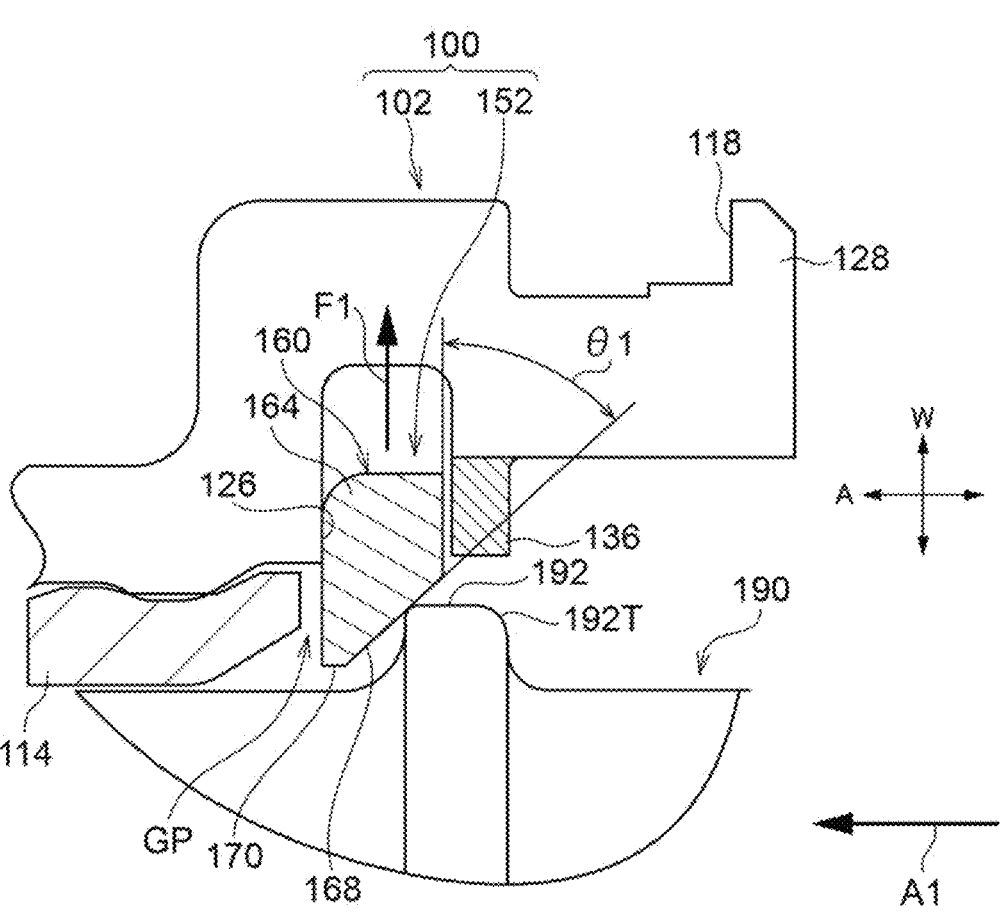
FIG. 3D is a partially enlarged cross-sectional view showing an example of the pipe joint of the first embodiment of the disclosure in the state in which the pipe is partially inserted into the housing, which is different from FIG. 3C.

In the present embodiment, as also shown in FIGS. 1D and 1E, the inclination angle $\theta1$ of the inclined surface 168 is set from 25 to 40 degrees. By the inclination angle $\theta1$ being 25 degrees or more, the pressing force acting on the inclined surface 168 from the spool 192 can be efficiently converted into the force toward the outer side in the width direction as compared to the case of an angle less than 25 degrees. In addition, since the inclination angle $\theta1$ is 40 degrees or less, an amount of movement of the detection claw 164 toward the outer side in the width direction can be ensured without excessively increasing the inclined surface 168 as compared to the case of the inclination angle $\theta1$ more than 40 degrees. FIG. 3C shows a case in which the inclination angle $\theta1$ is 25 degrees, and FIG. 3D shows a case in which the inclination angle $\theta1$ is 40 degrees. In either case, the detection arm 160 can be bent toward the outer side in the width direction.

In the present embodiment, as shown in detail in FIGS. 3C and 3D, in the state in which the retainer 152 is at the releasing position, a part of the front wall 126 is positioned on the front side of the detection arm 160. The front wall 126 is at a position offset toward the outer side in the width direction with respect to each detection arm 160.

Figure 3E:
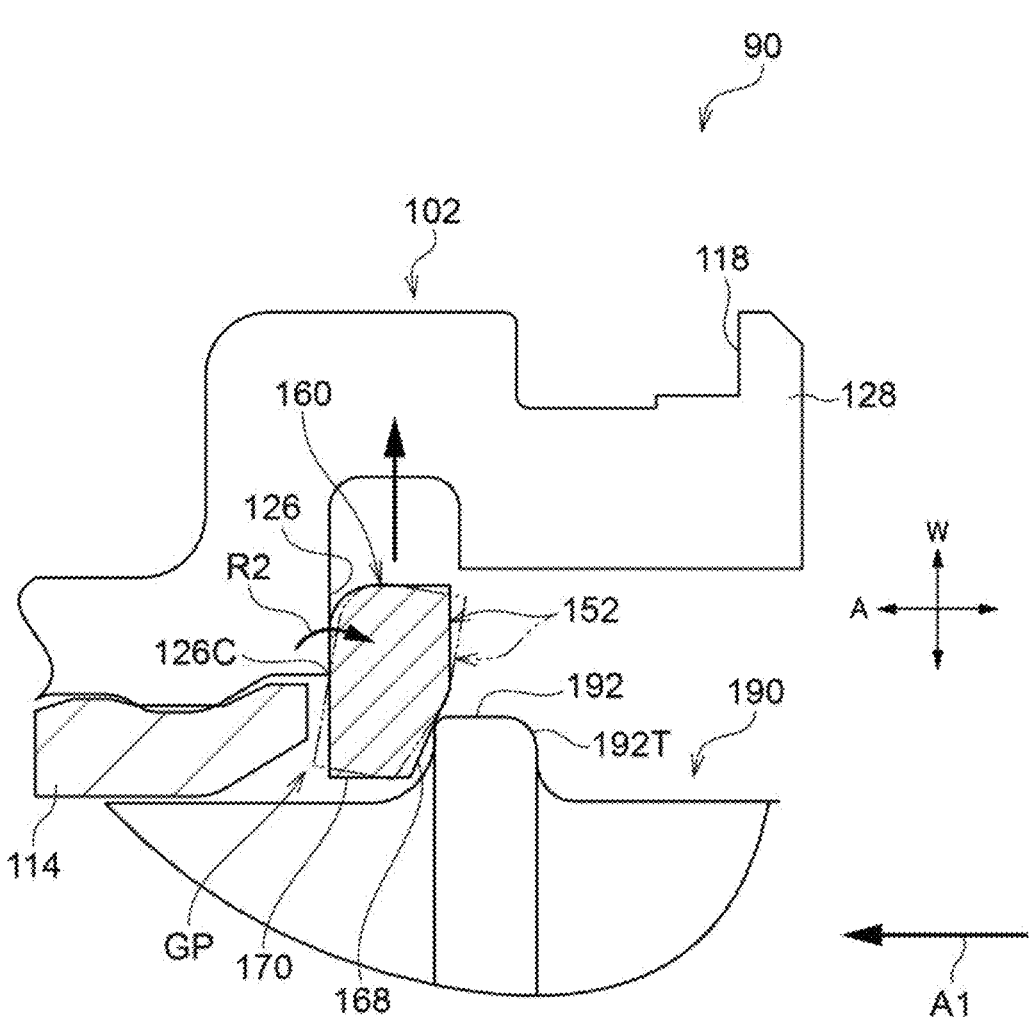
FIG. 3E is a partially enlarged cross-sectional view showing a pipe joint of a comparative example in the state in which the pipe is partially inserted into the housing.
Figure 3F:
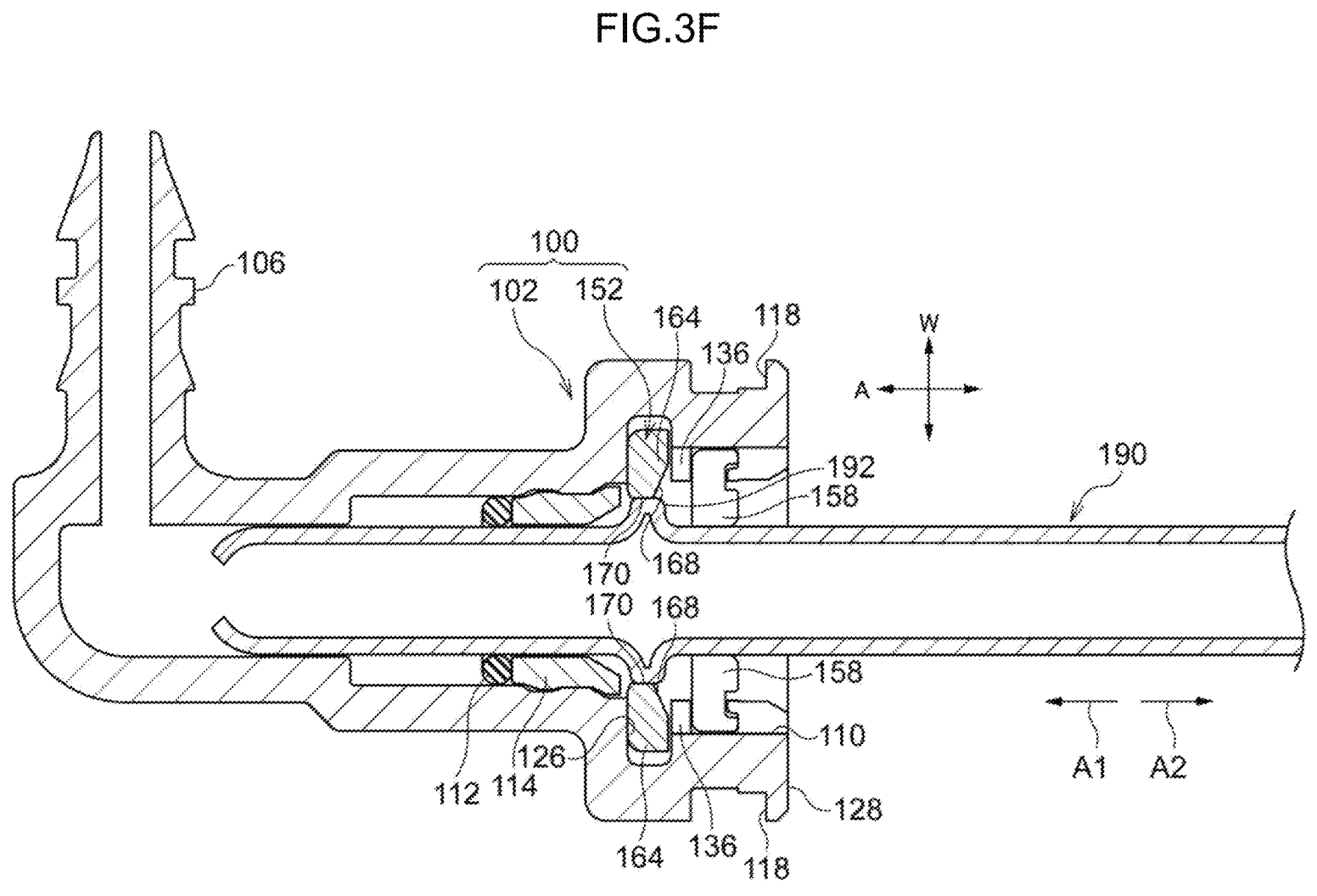

Here, FIG. 3E shows a partially enlarged pipe joint 90 having a shape without the partition wall 136 as a pipe joint of a comparative example.

In the pipe joint 90 of the comparative example, as in the present embodiment, a case in which the pressing force in the direction of the arrow A1 acts on the inclined surface 168 from the spool 192 of the pipe 190 is considered. In this case, in the pipe joint 90 of the comparative example, as indicated by a double-dotted line in FIG. 3E, the detection arm 160 rotates as if partially twisting around a corner 126C of the front wall 126 as the rotation center (see the arrow R2) and it is considered that it is not sufficiently bent toward the outer side in the width direction.

In contrast, in the present embodiment, the partition wall 136 is positioned on the rear side with respect to the detection arm 160, as shown in FIGS. 3C and 3D. Therefore, even though the detection arm 160 is to rotate as if twisting in the direction of the arrow R2 (see FIG. 3E), this force is released toward the outer side in the width direction by the detection arm 160 coming into contact with the partition wall 136. That is, twisting (rotation) of the detection arm 160 is blocked, and the detection arm 160 is maintained in a posture of being reliably bent (expanded) toward the outer side in the width direction.

Figure 3G:
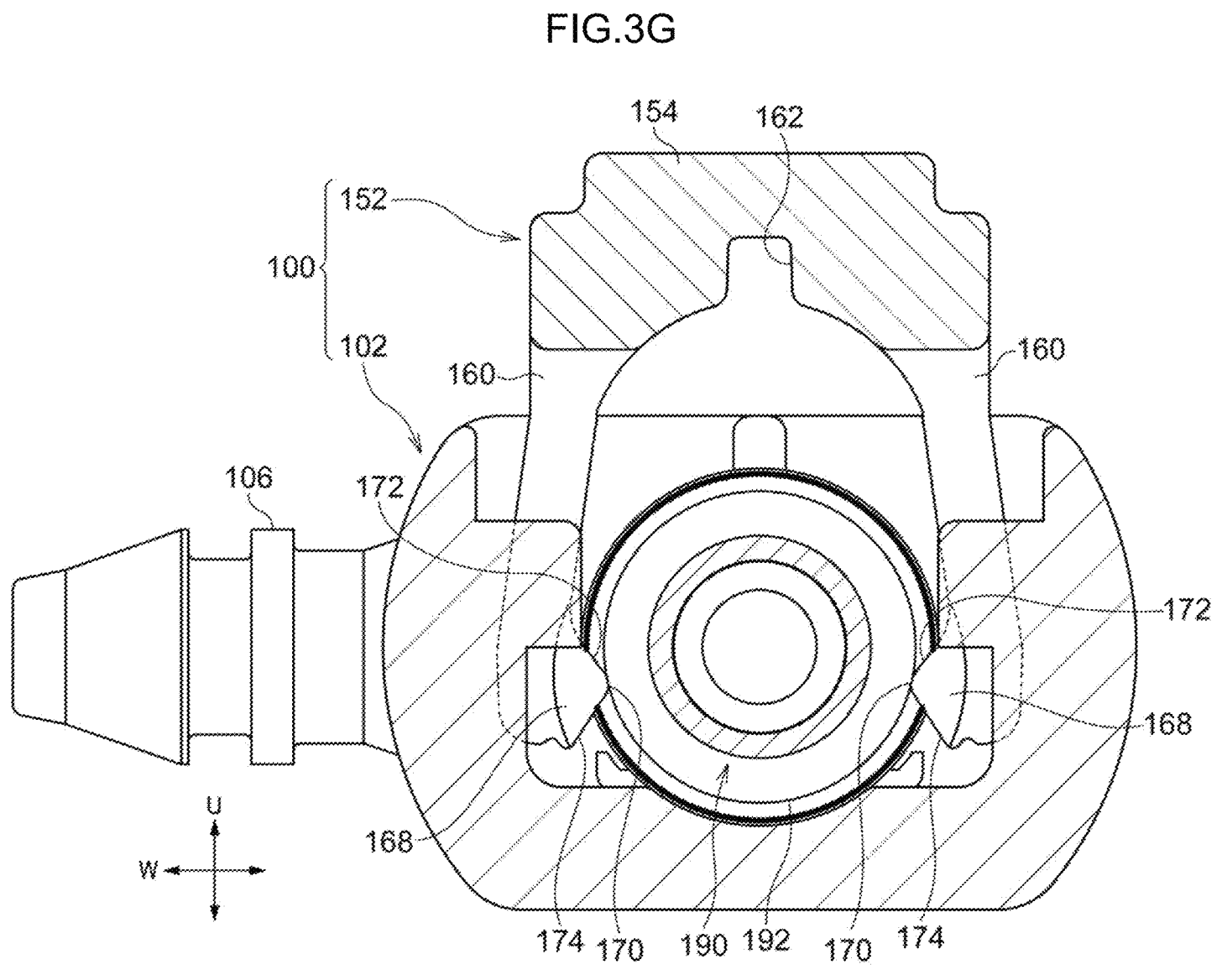
Figure 3H:
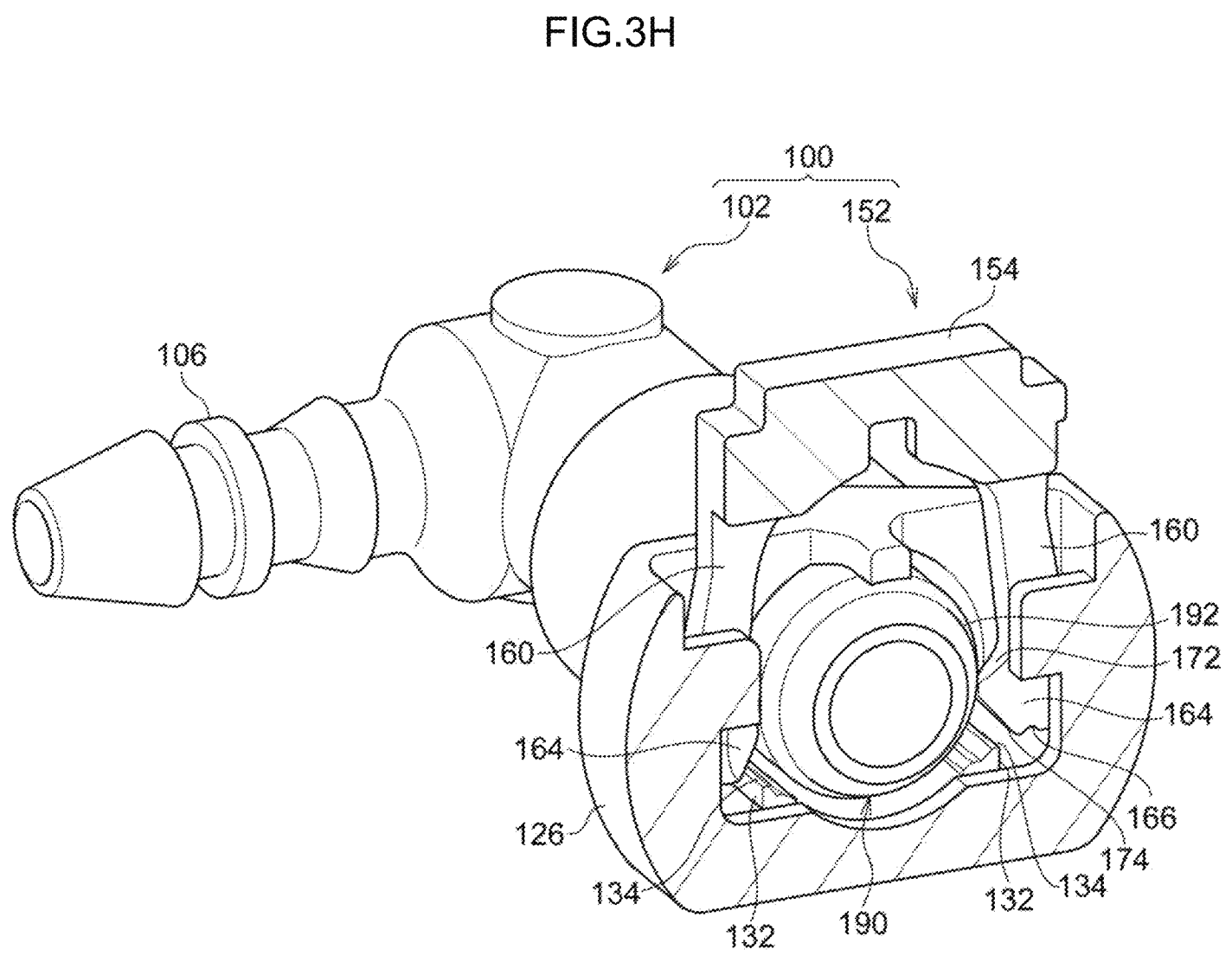

Then, the detection arm 160 is bent toward the outer side in the width direction and the pipe 190 is further pressed in the direction of the arrow A1, whereby the parallel surface 170 of the detection claw 164 comes into contact with the outer circumferential end of the spool 192 as shown in FIGS. 3F to 3H. That is, in this state, the detection claw 164 rides on the spool 192.

In the present embodiment, as shown in FIGS. 1D and 1E, the inclined surface ratio in the detection claw 164, that is, the ratio of the thickness T1 of the part of the inclined surface 168 to the thickness T2 of the entire detection claw 164 is 90% or less. As a result, the thickness T1 of the inclined surface 168 is ensured to be wider than the case of the inclined surface ratio of more than 90%. Therefore, the state in which the detection claw 164 rides on the spool 192 can be reliably maintained. For example, the position of the spool 192 in the axial direction of the pipe 190 varies due to tolerance. In addition, as shown in FIGS. 3C and 3D, a corner 192T is curved so as to protrude toward the outer side in the radial direction at the outer circumferential end of the spool 192. The radius of curvature of the outer circumferential end (curved part) of the spool 192 also varies due to tolerance. However, even though the position of the spool 192 and the radius of curvature of the outer circumferential end vary, the thickness of the parallel surface 170 is ensured in the present embodiment, and the effect of maintaining the state in which the detection claw 164 rides on the spool 192 is high.

In the state in which the detection claw 164 rides on the spool 192 in this manner, the pipe 190 can be further pressed toward the front side as shown in FIGS. 4A and 4B. Then, as shown in FIG. 4C, when the pipe 190 comes into contact with the top hat 114, the pipe 190 cannot be pressed any further.

In this state, the detection arm 160 is bent toward the outer side in the width direction, and the distal end of the detection arm 160 is positioned on the outer side in the width direction compared to the regulating wall 132. Since the distal end of the detection arm 160 does not face the regulating wall 132, the retainer 152 can be pressed in the direction of the arrow U1 with respect to the housing 102. The state shown in FIGS. 4A to 4E shows a state in which the retainer 152 is pressed into the housing 102 and the retainer 152 is at the locking position.

The third inclined surface 174 inclined upward toward the inner side in the width direction is formed on the detection claw 164 of the detection arm 160. In a case in which the retainer 152 is attached to the housing 102, the third inclined surface 174 comes into contact with the outer circumferential end of the spool 192. As a result, in a case in which the retainer 152 is pressed in the direction of the arrow U1 with respect to the housing 102, the third inclined surface 174 comes into oblique contact with the outer circumferential end of the spool 192 and slides, and the retainer 152 is easily pressed in.

When the locking claw 176 of the housing lock arm 156 passes over the projection 122 of the housing 102, the retainer 152 is in a state of being at the locking position. In the state in which the retainer 152 is at the locking position, the locking claw 176 is locked to the projection 120, and even though the retainer 152 is to be moved in the direction of the arrow U2, resistance acts.

In this state, as shown in FIGS. 4B and 4C, the pipe lock arm 158 is positioned on the rear side of the spool 192. As a result, the pipe 190 does not move in the direction of the arrow A2 with respect to the housing 102, and is locked at a predetermined position.

As shown in FIG. 4D, the notch 140 is provided in the lower part of the front wall 126 of the housing 102, and the notch 140 is at a position corresponding to the detection claw 164 of the retainer 152 at the locking position. In the state in which the retainer 152 is at the locking position, the detection claw 164 can be visually recognized from the front side through the notch 140. That is, since the operator can visually confirm that the retainer 152 is at the locking position from the front side, a connection failure in which the pipe 190 is not locked can be prevented.

The retainer 152 is provided with the grip part 182. In a case in which the retainer 152 is pulled out from the housing 102 or an unlocking operation is performed, the operator directly grips the grip part 182 from both sides in the width direction, thereby improving workability and also eliminating the need to use special tools, or the like.

In particular, the grip part 182 is formed with the stepped surface 184, and when the stepped surface 184 is held by a finger or the like, slippage is prevented, which facilitates the pulling operation and the unlocking operation. Note that there is no problem in gripping the grip part 182 to perform the pressing operation when the retainer 152 is pressed in. Even in this case, the pressing operation is easily performed by gripping the grip part 182.

Figure 4E:
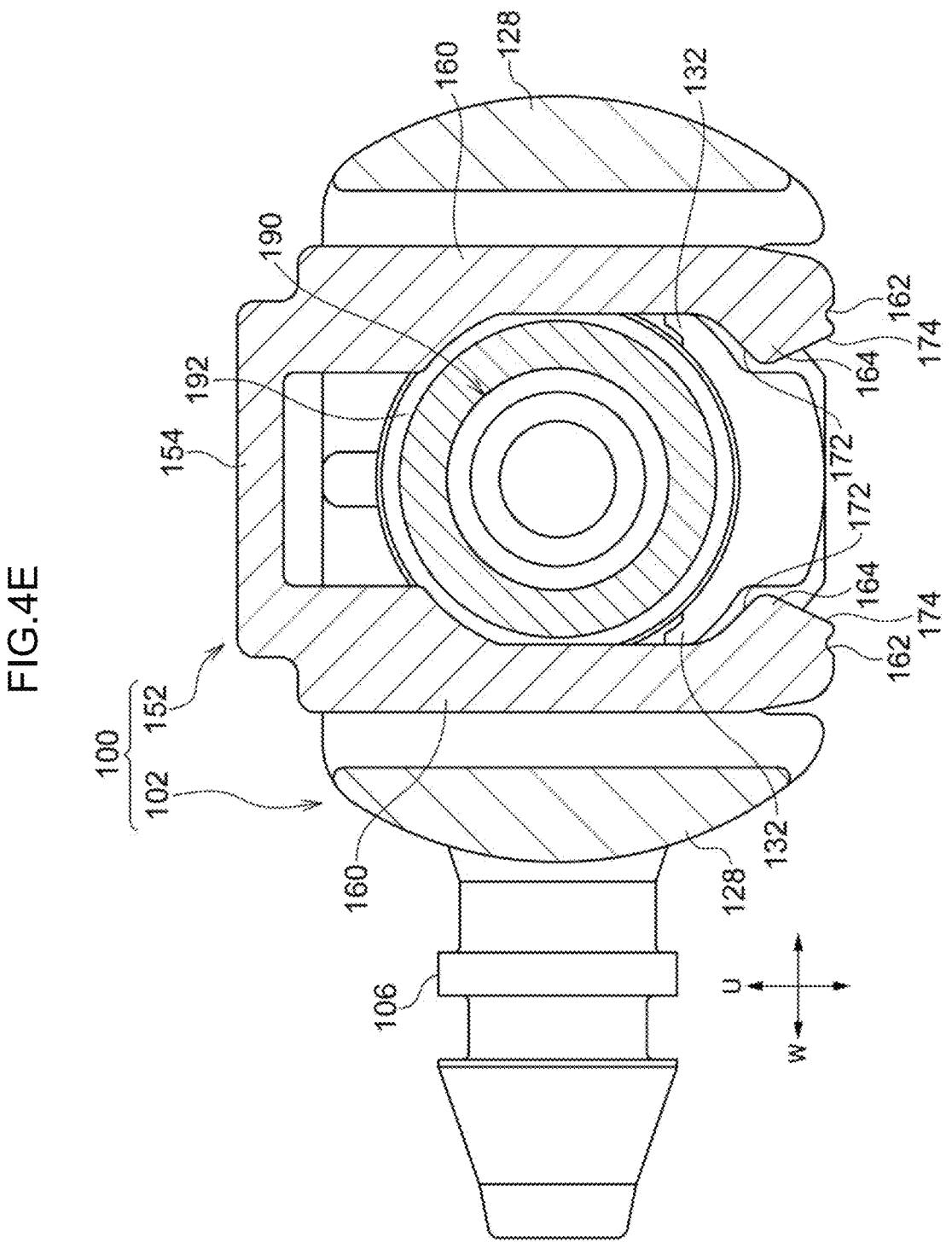
FIG. 4E is a longitudinal cross-sectional view showing the pipe joint of the first embodiment of the disclosure in the state in which the pipe is locked to the housing.

As shown in FIG. 4E, the detection claw 164 of the detection arm 160 is formed with the second inclined surface 172 inclined downward toward the inner side in the width direction. In a case in which the retainer 152 is pulled out from the housing 102, the second inclined surface 172 comes into oblique contact with the lower surface of the regulating wall 132 and slides, and thus the unlocking operation of the retainer 152 is easily performed.

Application parts of the pipe joint 100 according to the technique of the disclosure are not particularly limited, and the pipe joint 100 can be applied to a joint that connects two pipes (the pipe 190 and a tube (not shown) in the above example). As an example, the pipe joint 100 can be applied as a joint of a pipe through which liquid (fuel, coolant, and the like) flows in an automobile, a two-wheeled vehicle, or the like. More specifically, in an automobile, the pipe joint 100 according to the technique of the disclosure can be applied to a connection part between a fuel tank and various fuel pipes, a connection part connecting various pipes in a canister, an intercooler, a fuel injection rail, and the like.

In particular, for example, in a two-wheeled vehicle, a fuel tank can be attached and detached at a high frequency. Therefore, when the pipe joint 100 according to the technique of the disclosure is applied to a connection part of the pipe connecting a fuel tank and an engine in a two-wheeled vehicle, the pipe joint 100 includes the grip part 182, and thus the pressing operation and the unlocking operation of the retainer 152 are easily performed at the time of connecting and disconnecting a pipe associated with the attachment and detachment of the fuel tank. It is a matter of course that the operation of unlocking the retainer 152 at a connection part of a pipe to be maintained is easily performed at the time of maintenance or the like even in a four-wheeled vehicle as well as a two-wheeled vehicle.

Although the technique of the disclosure has been described above with reference to the embodiments, the technique of the disclosure can be implemented with various modifications of the embodiments without departing from the gist. In addition, the scope of rights of the disclosure is not limited to the above embodiments.

The disclosure of Japanese Patent Application No. 2022-110515 filed on Jul. 8, 2022 is incorporated herein by reference in its entirety.

All documents, patent applications, and technical standards described in this specification are incorporated herein by reference to the same extent as if each individual document, patent application, and technical standard are specifically and individually indicated to be incorporated by reference.

The invention claimed is:

1. A pipe joint comprising:
a housing formed with an insertion hole into which a pipe including an annular spool is inserted;
a retainer attached to a storage opening provided at an outer circumferential wall of the housing and movable from a releasing position to a locking position by being pressed in;
a detection arm provided at the retainer, regulating pressing of the retainer by a regulating wall of the housing in a state in which the retainer is at the releasing position, and releasing the regulation by the regulating wall by bending toward an outer side in a radial direction of the housing;
a pipe lock arm provided on a rear side in an insertion direction of the pipe compared to the detection arm in the retainer and facing, in a state in which the retainer is at the locking position, the spool of the pipe inserted at a predetermined position in the housing, in the insertion hole and on the rear side in the insertion direction; and
a detection claw including an inclined surface provided at the detection arm so as to be inclined with respect to the insertion direction of the pipe into the housing and converting a pressing force received from the spool of the pipe inserted into the housing, into a force toward the outer side in the radial direction, and a parallel surface provided at the detection arm so as to be parallel to the insertion direction of the pipe on an inner side in a radial direction of the inclined surface and riding on the spool of the pipe in a state in which the detection arm is bent toward the outer side in the radial direction, wherein
a thickness of a part provided with the inclined surface in the insertion direction is from 20% to 90% of a thickness of the detection claw in the insertion direction.

2. The pipe joint according to claim 1, wherein an inclination angle of the inclined surface with respect to the radial direction of the housing is from 25 to 40 degrees.

3. The pipe joint according to claim 1, wherein the detection claw protrudes from the detection arm to the inner side in the radial direction and includes, on a rear side in a pressing direction toward the housing in a protruding part, a second inclined surface inclined toward the outer side in the radial direction on progression toward the rear side.

4. The pipe joint according to claim 1, further comprising a grip part provided at the retainer so as to be positioned on a rear side in a pressing direction of the retainer from the releasing position toward the locking position and protruding in a direction intersecting the pressing direction.

* * * * *